(12) United States Patent
Shirai et al.

(10) Patent No.: US 9,335,858 B2
(45) Date of Patent: May 10, 2016

(54) INPUT DEVICE

(75) Inventors: Takahiro Shirai, Aichi (JP); Yoshihisa Hirano, Aichi (JP); Yasuhiro Fujioka, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 328 days.

(21) Appl. No.: 13/568,254

(22) Filed: Aug. 7, 2012

(65) Prior Publication Data

US 2013/0038551 A1   Feb. 14, 2013

(30) Foreign Application Priority Data

Aug. 9, 2011  (JP) ................................ 2011-173840
Jun. 14, 2012  (JP) ................................ 2012-134736

(51) Int. Cl.
  *G06F 3/041*  (2006.01)
  *G06F 1/16*  (2006.01)
  *G06F 3/044*  (2006.01)

(52) U.S. Cl.
  CPC ............ *G06F 3/0416* (2013.01); *G06F 1/1643* (2013.01); *G06F 3/041* (2013.01); *G06F 3/044* (2013.01)

(58) Field of Classification Search
  CPC ....... G06F 3/041; G06F 3/016; G06F 3/0414; G06F 1/1643
  USPC .......................................................... 345/173
  See application file for complete search history.

(56) References Cited

U.S. PATENT DOCUMENTS

| 4,046,386 A | * | 9/1977 | Gosling ............. G11B 3/08519 369/220 |
| 6,906,695 B1 | * | 6/2005 | Ishida .................. G10H 1/0575 178/17 C |
| 2006/0250377 A1 | * | 11/2006 | Zadesky ................ G06F 1/1613 345/173 |

(Continued)

FOREIGN PATENT DOCUMENTS

| CN | 101387929 A1 | 3/2009 |
| CN | 101996812 A | 3/2011 |
| JP | 2009-298380 | 12/2009 |

OTHER PUBLICATIONS

Chinese Office Action issued in Chinese Patent Application No. 201210277444.0 on Sep. 10, 2015.

(Continued)

*Primary Examiner* — Srilakshmi K Kumar
*Assistant Examiner* — Carl Adams
(74) *Attorney, Agent, or Firm* — Morgan, Lewis & Bockius LLP

(57) ABSTRACT

An input device includes a touch panel configured to be displaceable in vertical direction and to be urged upwardly toward an original position in a non-depressed state, a depression start detector that detects a start of a depression manipulation of the touch panel while the touch panel is depressed and displaced downward, a determination manipulation detector that detects a determination manipulation based on the touch panel is displaced to a position which is lower than a position where the depression start detector detects the start of the depression manipulation, and a decision unit that stores the touch position when the depression start detector detects the start of the depression manipulation, and thereafter decides that the determination manipulation has been conducted at the stored touch position when the determination manipulation detector detects the determination manipulation.

13 Claims, 18 Drawing Sheets

(56) References Cited

U.S. PATENT DOCUMENTS

| | | | |
|---|---|---|---|
| 2009/0065267 A1 | 3/2009 | Sato | |
| 2009/0091536 A1* | 4/2009 | Callaghan | G06F 3/023 345/168 |
| 2009/0135145 A1* | 5/2009 | Chen | G06F 3/016 345/173 |
| 2011/0021251 A1* | 1/2011 | Linden | G06F 1/1616 455/566 |

OTHER PUBLICATIONS

Chinese Office Action issued in Chinese Patent Application No. 201210277444.0 on Mar. 13, 2015.

* cited by examiner

INPUT DEVICE

BACKGROUND

The present disclosure relates to an input device having a touch panel.

There has been known an input device having a touch panel in which a position of a finger with which a surface of the touch panel has been touched is detected by a touch position detection unit, and a fact that the touch panel has been depressed is detected by, for example, a push switch of the depression type to determine an item selected at the touch position (for example, refer to JP-A-2009-298380).

In the input device of the above type, a determination manipulation push switch needs a given stroke until the push switch turns on. The position of the manipulating finger is displaced from a manipulating start position during the stroke for depressing the touch panel after the touch panel has been touched, to thereby determine an unintended item. As measures against this drawback, for example, there has been proposed that the stroke of the depression type switch for determination manipulation is extremely shortened. However, there is a possibility that the operability is deteriorated such that the determination manipulation is conducted without a user's intent when the touch panel is slightly moved, or the touch panel slightly moves due to vibration.

SUMMARY

Under the circumstances, an object of the present disclosure is to provide an input device that can prevent a positional displacement during determination manipulation as much as possible while having a stroke suitable for the determination manipulation.

In order to achieve the above object, according to the present disclosure, there is provided an input device comprising:

a touch panel configured to be displaceable in vertical direction and to be urged upwardly toward an original position in a non-depressed state, and that has a touch position detector which detects a touch position when a surface of the touch panel is touched with a finger;

a depression start detector that detects a start of a depression manipulation of the touch panel while the touch panel is depressed and displaced downward;

a determination manipulation detector that detects a determination manipulation based on the touch panel is displaced to a position which is lower than a position where the depression start detector detects the start of the depression manipulation of the touch panel; and a decision unit that stores the touch position detected by the touch position detector when the depression start detector detects the start of the depression manipulation of the touch panel, and thereafter decides that the determination manipulation has been conducted at the stored touch position when the determination manipulation detector detects the determination manipulation.

When a user selects any item and conducts the determination manipulation on the touch panel, the user first touches the item selected on the touch panel with the finger, and depresses the touch panel in that state. According to the present disclosure, even if the position of the manipulating finger is displaced from the manipulation start position when depressing the touch panel, the touch position that has been touched with the finger when starting the depression is stored, and it is determined that the determination manipulation has been conducted at the stored touch position. For that reason, the item to be manipulated by the user can be specified. A given stroke for allowing the determination manipulation detector to determine the determination manipulation is required for the determination manipulation. Therefore, according to the present disclosure, the positional displacement when conducting the determination manipulation can be prevented as much as possible while having the stroke suitable for the determination manipulation.

BRIEF DESCRIPTION OF THE DRAWINGS

The above objects and advantages of the present disclosure will become more apparent by describing in detail preferred exemplary embodiments thereof with reference to the accompanying drawings, wherein:

FIGS. 1A and 1B illustrate an input device according to a first embodiment, in which FIG. 1A is a plan view thereof, and FIG. 1B is a vertically cross-sectional front view of the input device taken along a line X-X in FIG. 1A;

FIGS. 5A and 5B are diagrams illustrating an input device according to a second embodiment, in which FIG. 5A is a plan view thereof, and FIG. 5B is a vertically cross-sectional view of the input device taken along a line X-X in FIG. 5A;

FIGS. 7A and 7B are diagrams illustrating an input device according to a third embodiment, in which FIG. 7A is a plan view thereof, and FIG. 7B is a vertically cross-sectional view of the input device taken along a line X-X in FIG. 7A;

FIGS. 10A and 10B are diagrams illustrating an input device according to a fourth embodiment, in which FIG. 10A is a plan view thereof, and FIG. 10B is a vertically cross-sectional view of the input device taken along a line X-X in FIG. 10A;

FIGS. 12A and 12B are diagrams illustrating an input device according to a fifth embodiment, in which FIG. 12A is a plan view thereof, and FIG. 12B is a vertically cross-sectional view of the input device taken along a line X-X in FIG. 12A;

DETAILED DESCRIPTION OF EXEMPLARY EMBODIMENTS

Figure 1A:
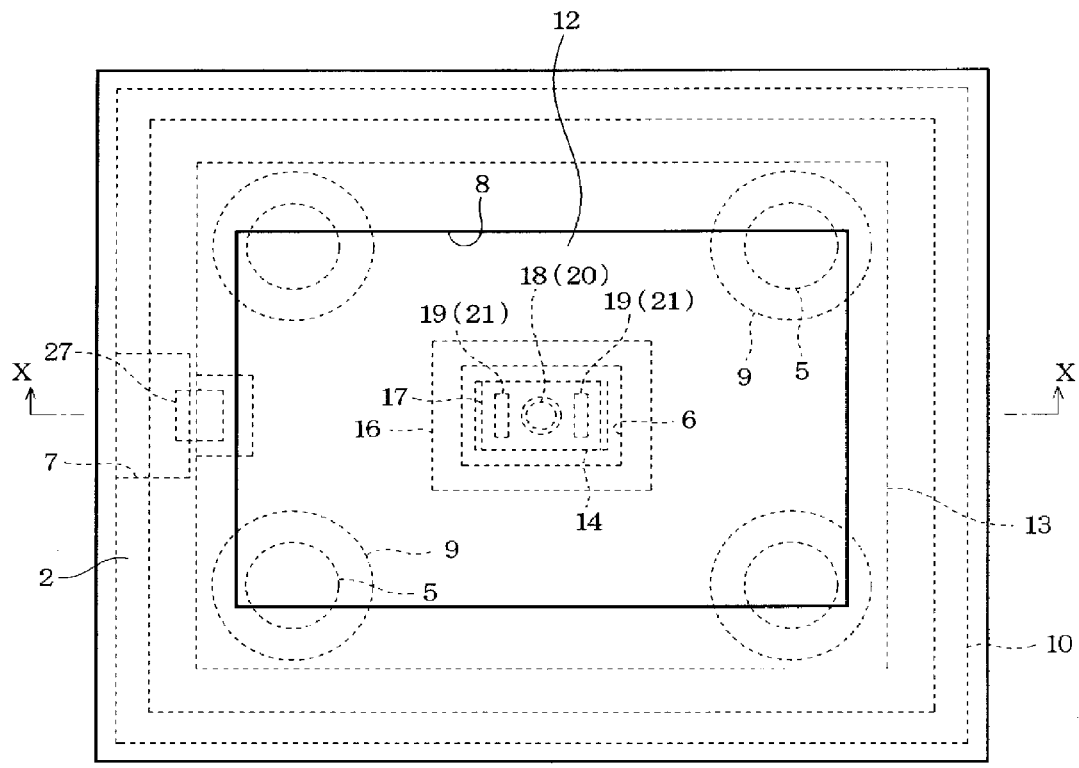

Hereinafter, an input device according to various embodiments will be described with reference to the accompanying drawings. In the respective embodiments, the substantially same constituent components are indicated by identical reference numerals or symbols, and a description thereof will be omitted.

First Embodiment

Figure 1B:
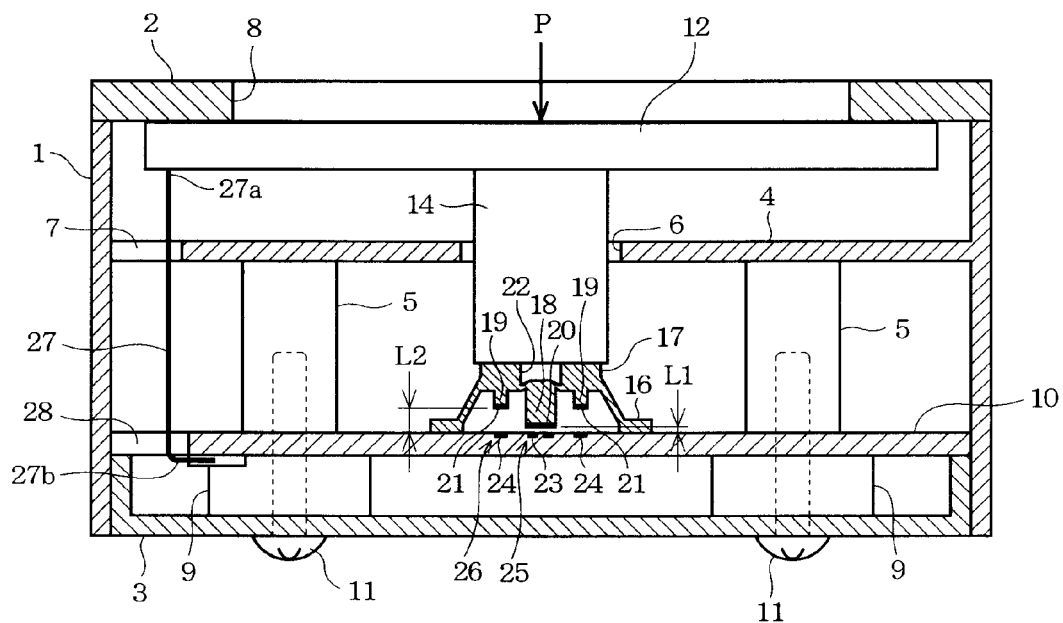

A first embodiment will be described with reference to FIGS. 1A to 4. In FIGS. 1A and 1B, an outer case of an input device includes a rectangular tubular body 1, a vessel 2 fixed to an upper part of the body 1, and a cover 3 fixed to a lower part of the body 1. In the above configuration, a partition part 4 is integrally formed on an interior of the body 1 so as to be located in an intermediate position in the vertical direction to partition the interior into upper and lower portions. Cylindrical bosses 5 are integrally formed on a lower portion of the partition part 4 at four locations. A rectangular opening part 6 is formed in the partition part 4 at a substantially center thereof, and a rectangular notch 7 is formed on a left side of the partition part 4 in FIGS. 1A and 1B. The vessel 2 has a rectangular opening part 8 in the center thereof so as to form a rectangular frame when viewed from above.

A wiring substrate 10 formed of a printed wiring board is arranged over an upper portion of the lower cover 3 through a spacer 9. The cover 3 and the wiring substrate 10 are fitted to the lower portion of the body 1 so as to be joined to the lower portion of the body 1 by allowing screws 11 inserted from below of the cover 3 to penetrate through the spacer 9 and the wiring substrate 10 and to be screwed into the bosses 5.

A touch panel 12 (touch position detecting unit@) is positioned between the partition part 4 and the vessel 2 within the body 1, and arranged to be displaceable in the vertical direction. The touch panel 12 is shaped into a rectangular plate larger than the opening part 8 of the vessel 2, and includes a touch position detector of the capacitance type, and a display unit of the liquid crystal type. The touch position detector detects a touch position (coordinates) when an upper surface of the touch panel 12 is touched with a finger of a user. The display unit displays the items selected by the user. An operation area 13 (refer to FIG. 1A) in the touch panel 12 is slightly larger than the opening part 8 of the vessel 2. A protrusion 14 that protrudes downward is integrally formed on a lower surface of the touch panel 12. The protrusion 14 passes through the opening part 6 of the partition part 4, and protrudes from the partition part 4 downward.

A rubber sheet 16 is arranged on an upper surface of the wiring substrate 10 so as to be positioned below the protrusion 14. A dome part 17 protruded upward is elastically deformably disposed on the rubber sheet 16, and an upper surface of the dome part 17 is abutted against a lower surface of the protrusion 14 from below. A first protrusion 18 protruded downward and second protrusions 19 provided on both of right and left sides of the first protrusion 18 interposed therebetween and protruded downward are integrally formed on a lower surface of the upper portion of the dome part 17. A lower end of the first protrusion 18 is protruded downward from lower ends of the second protrusions 19. A first movable contact 20 is disposed on the lower end of the first protrusion 18, and second movable contacts 21 are disposed on the respective lower surfaces of the second protrusions 19. A recess 22 is formed in an upper portion of the dome part 17 so as to be located above the first protrusion 18.

Figure 2:
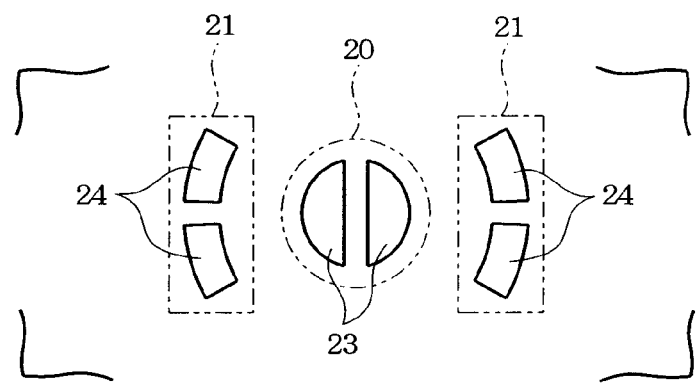
FIG. 2 is a plan view of a fixed contact portion.
Figure 3:
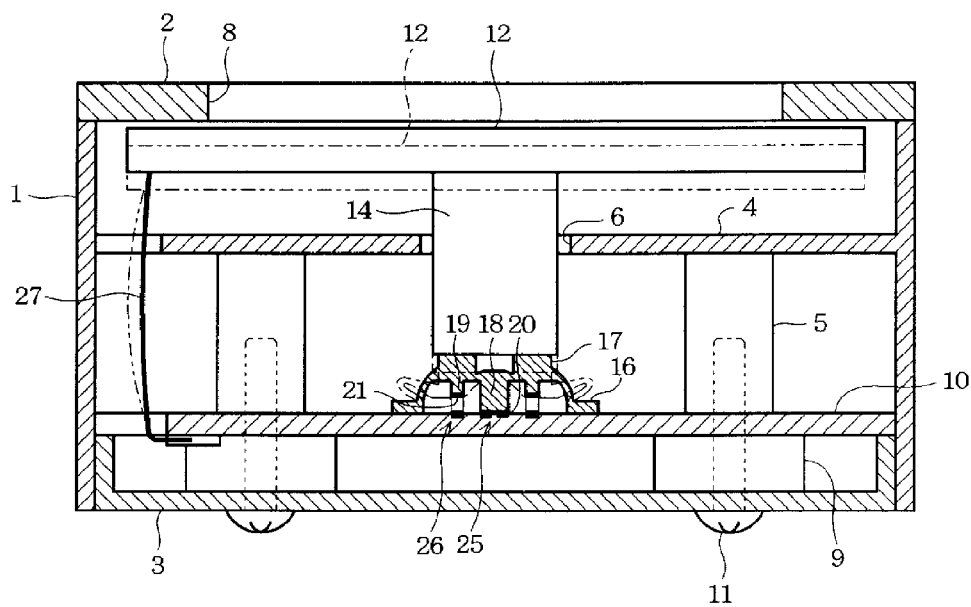
FIG. 3 is a vertically cross-sectional view illustrating the operation of the input device.
Figure 4:
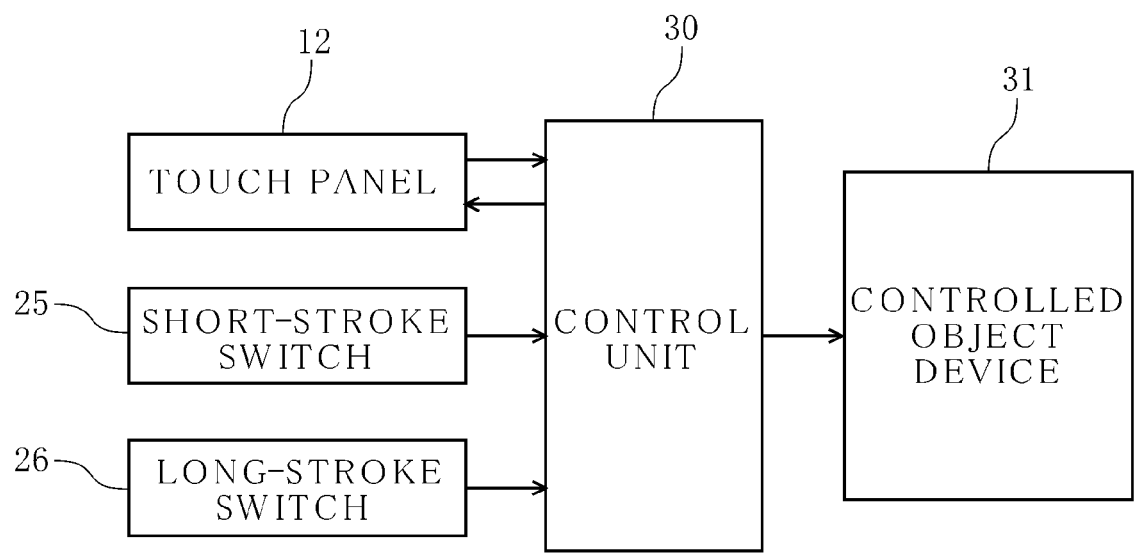
FIG. 4 is a block diagram illustrating an electric configuration of the input device.

As illustrated in FIG. 2, on the upper surface of the wiring substrate 10, a pair of first fixed contacts 23 is disposed at a position facing the first movable contact 20, and a pair of second fixed contacts 24 is disposed at a position facing each of the second movable contacts 21. In this example, when it is assumed that a gap dimension between the first movable contact 20 and the first fixed contacts 23 is a first stroke L1, and a gap dimension between the second movable contacts 21 and the second fixed contacts 24 is a second stroke L2, the second stroke L2 is set to be longer than the first stroke L1 (L2>L1). The first stroke L1 is set to be as short as the finger is not displaced during the manipulation of the user, and the second stroke L2 is set to be as long as the user has the stroke feeling (manipulation feeling).

The first movable contact 20 and the first fixed contacts 23 configure a short-stroke switch 25, and the second movable contacts 21 and the second fixed contacts 24 configure a long-stroke switch 26 longer in stroke than the short-stroke switch 25. The short-stroke switch 25 configures a depression start detector for detecting the depression start of the touch panel 12. Also, the long-stroke switch 26 configures a determination manipulation detector for detecting the determination manipulation. In a non-depressed state, the touch panel 12 is urged to an upper original position illustrated in FIG. 1B due to an elastic restoring force of the dome part 17.

One end of the touch panel 12 (left end in FIGS. 1A and 1B) is connected to one end 27a of a flexible printed circuit board 27. The other end 27b of the flexible printed circuit board 27 is connected to a lower surface of the wiring substrate 10 through the notch 7 of the partition part 4 and a notch 28 formed in the wiring substrate 10. Accordingly, the touch panel 12 and the wiring substrate 10 are electrically connected by the flexible printed circuit board 27.

A control unit 30 (refer to FIG. 4) is disposed on the wiring substrate 10. The control unit 30 is configured by, for example, a microcomputer, and functions as a decision unit of the present disclosure. The control unit 30 receives a touch position detection signal from the touch position detector of the touch panel 12, a signal of the short-stroke switch 25, and a signal of the long-stroke switch 26. The control unit 30 has a function of controlling the display unit of the touch panel 12, and also controlling a controlled object device 31 on the basis of a control program installed in advance.

Subsequently, the operation of the above configuration will be described.

First, the touch panel 12 is located at the original position illustrated in FIG. 1B in the non-depressed state, and a plurality of selection items are displayed in the display unit of the touch panel 12. In this state, when the user selects one selection item from a plurality of displayed selection items to execute the selected item, the user touches a position at which a desired selection item is displayed among the plurality of selection items displayed on the touch panel 12 with his finger, and depresses the touch panel 12 downward in that state (refer to an arrow P in FIG. 1B). With this manipulation, the touch panel 12 is displaced downward from the original position by the first stroke L1 to first turn on the short-stroke switch 25 (refer to a solid position in FIG. 3). Thereafter, the touch panel 12 is displaced downward by the second stroke L2 which is shorter than the first stroke L1 to turn on the long-stroke switch 26 (refer to two-dot chain lines in FIG. 3).

In this situation, the control unit 30 determines that the touch panel 12 has started to be depressed, by turning on the short-stroke switch 25, stores the touch position (coordinates) of the finger at that time, and stores the selected item. Thereafter, the control unit 30 determines that the determination manipulation has been conducted, by turning on the long-stroke switch 26, determines that the manipulation for determining the item corresponding to the stored touch position has been conducted, and controls the controlled object device 31 corresponding to that item.

In this situation, even if the position of the finger is displaced since the touch panel 12 starts to be depressed until the long-stroke switch 26 turns on, the control unit 30 stores the position of the finger when the touch panel 12 starts to be depressed (when the short-stroke switch 25 for detecting the depression start turns on), and determines that the determination manipulation is conducted with the selection of the item corresponding to that position. Therefore, the positional displacement when conducting the determination manipulation can be prevented as much as possible, and the determination manipulation can be prevented from being conducted without the user's intent. Also, in the determination manipulation, there is a need to turn on the long-stroke switch 26 with a stroke sufficient for the user to have the stroke feeling. Therefore, according to this embodiment, the positional displacement when conducting the determination manipulation can be prevented as much as possible while having the stroke suitable for the determination manipulation.

Second Embodiment

Figure 5A:
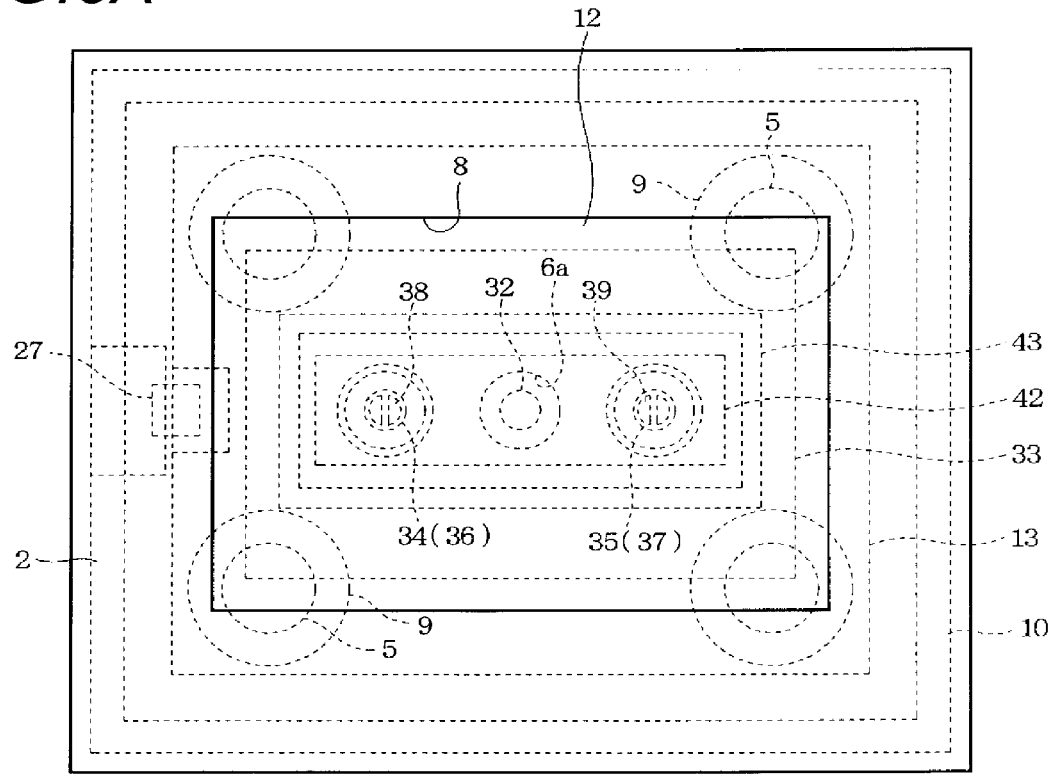
Figure 5B:
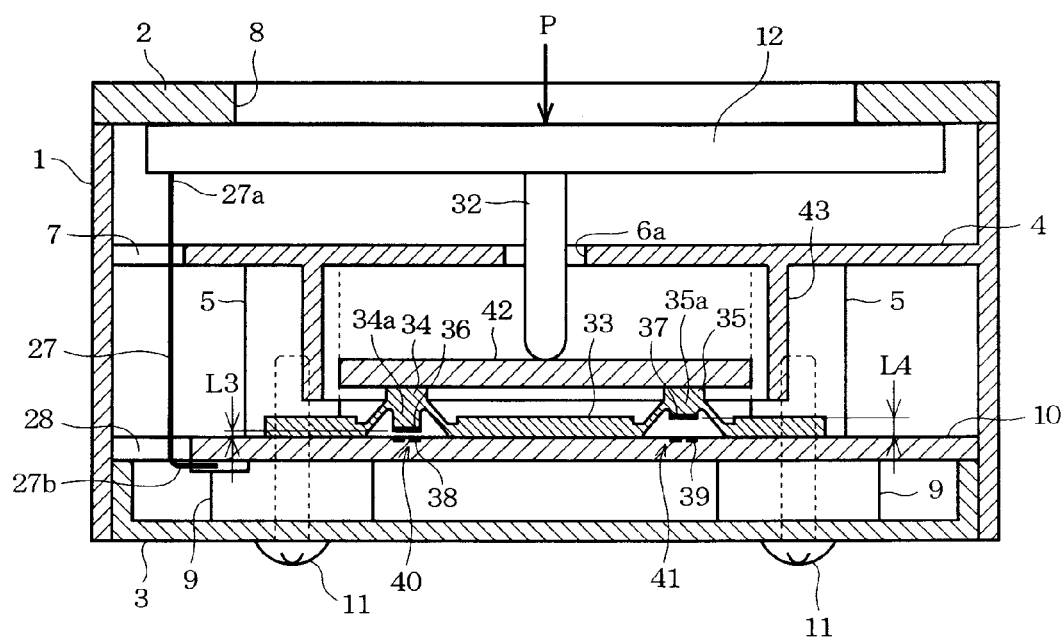
Figure 6:
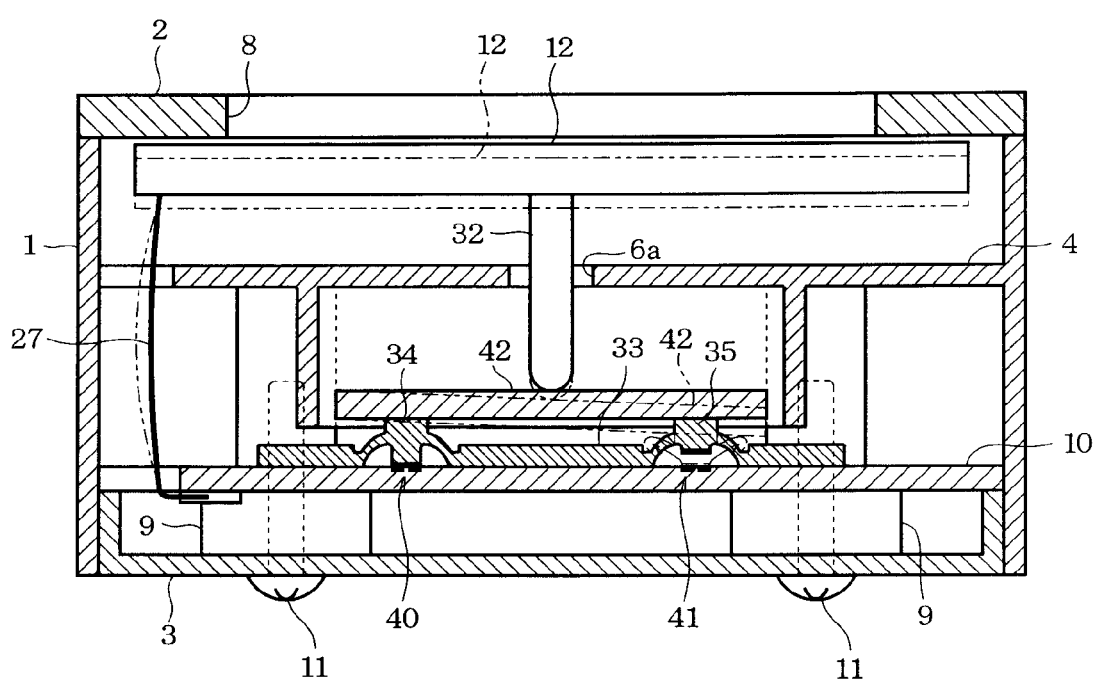
FIG. 6 is a vertically cross-sectional view illustrating the operation of the input device according to the second embodiment.

FIGS. 5A, 5B, and 6 illustrate a second embodiment of the present disclosure. The second embodiment is different from the first embodiment in the following matters.

A protrusion 32 disposed on the lower surface of the touch panel 12 is shaped into a cylinder thinner than the protrusion 14. A lower end of the protrusion 32 is inserted into a circular opening part 6a formed in the partition part 4 from above. On a rubber sheet 33 arranged on the upper surface of the wiring substrate 10, a first dome part 34 is positioned at a left side of the protrusion 32 so as to be elastically deformable, and a second dome part 35 is positioned at a right side of the protrusion 32 so as to be elastically deformable. In the above configuration, a protrusion 34a protruded downward is integrally formed on a lower surface of an upper portion of the first dome part 34, and a first movable contact 36 is disposed on a lower surface of the protrusion 34a. A protrusion 35a shorter in height dimension than the protrusion 34a is integrally formed on a lower surface of an upper portion of the second dome part 35, and a second movable contact 37 is disposed on a lower surface of the protrusion 35a.

On the upper surface of the wiring substrate 10, a pair of first fixed contacts 38 is located at a position facing the first movable contact 36, and a pair of second fixed contacts 39 is located at a position facing the second movable contact 37. In this example, when it is assumed that a gap dimension between the first movable contact 36 and the first fixed contacts 38 is a first stroke L3, and a gap dimension between the second movable contacts 37 and the second fixed contacts 39 is a second stroke L4, the second stroke L4 is set to be longer than the first stroke L3 (L4>L3). The first stroke L3 is set to be as short as the finger is not displaced during the manipulation of the user, and the second stroke L4 is set to be as long as the user has the stroke feeling (manipulation feeling).

The first movable contact 36 and the first fixed contacts 38 configure a short-stroke switch 40, and the second movable contacts 37 and the second fixed contacts 39 configure a long-stroke switch 41 longer in stroke than the short-stroke switch 40. The short-stroke switch 40 configures a depression start detector for detecting the depression start of the touch panel 12. Also, the long-stroke switch 41 configures a determination manipulation detector for detecting the determination manipulation.

An upper surface of the first dome part 34 is set to be identical in height with an upper surface of the second dome part 35. A bridged plate 42 shaped into a rectangular plate is bridged between the upper surface of the first dome part 34 and the upper surface of the second dome part 35. An upper surface of the bridged plate 42 is abutted against a lower end of the protrusion 32 from below. Similarly, in this case, in the non-depressed state, the touch panel 12 is urged to an upper original position illustrated in FIG. 5B due to elastic restoring forces of the first dome part 34 and the second dome part 35. A rectangular frame 43 is integrally formed on the lower surface of the partition part 4 so as to surround the bridged plate 42.

Subsequently, the operation of the above configuration will be described.

The touch panel 12 is located at the original position illustrated in FIG. 5B in the non-depressed state, and a plurality of selection items are displayed in the display unit of the touch panel 12. In this state, when the user selects one selection item from a plurality of displayed selection items to execute the selected item, the user touches a position at which a desired selection item is displayed among the plurality of selection items displayed on the touch panel 12 with his finger, and depresses the touch panel 12 downward in that state (refer to an arrow P in FIG. 5B). With this manipulation, the touch panel 12 is displaced downward from the original position by the first stroke L3 whereby the bridged plate 42 is also displaced downward. First, the short-stroke switch 40 turns on (refer to a solid position in FIG. 6). Thereafter, the touch panel 12 is further displaced downward whereby the bridged plate 42 is inclined so that a right side of the bridged plate 42 descends with the left first dome part 34 as a fulcrum to turn on the long-stroke switch 41 (refer to two-dot chain lines in FIG. 6).

In this situation, the control unit 30 determines that the touch panel 12 has started to be depressed, by turning on the short-stroke switch 40, stores the touch position (coordinates) of the finger at that time, and stores the selected item. Thereafter, the control unit 30 determines that the determination manipulation has been conducted, by turning on the long-stroke switch 41, determines that the manipulation for determining the item corresponding to the stored touch position has been conducted, and controls the controlled object device 31 corresponding to that item.

In this situation, even if the position of the finger is displaced since the touch panel 12 starts to be depressed until the long-stroke switch 41 turns on, the control unit 30 determines that the determination manipulation has been conducted with the selection of the item corresponding to the position of the finger when starting to depress the touch panel 12 (when the short-stroke switch 40 for detecting the depression start turns on). As a result, the positional displacement when conducting the determination manipulation can be prevented as much as possible, and the determination manipulation can be prevented from being conducted without the user's intent. Also, in the determination manipulation, there is a need to turn on the long-stroke switch 41. Therefore, similarly, according to this embodiment, the positional displacement when conducting the determination manipulation can be prevented as much as possible while having the stroke suitable for the determination manipulation.

Third Embodiment

FIGS. 7A to 9 illustrate a third embodiment of the present disclosure. The third embodiment is different from the first embodiment in the following matters.

Figure 7A:
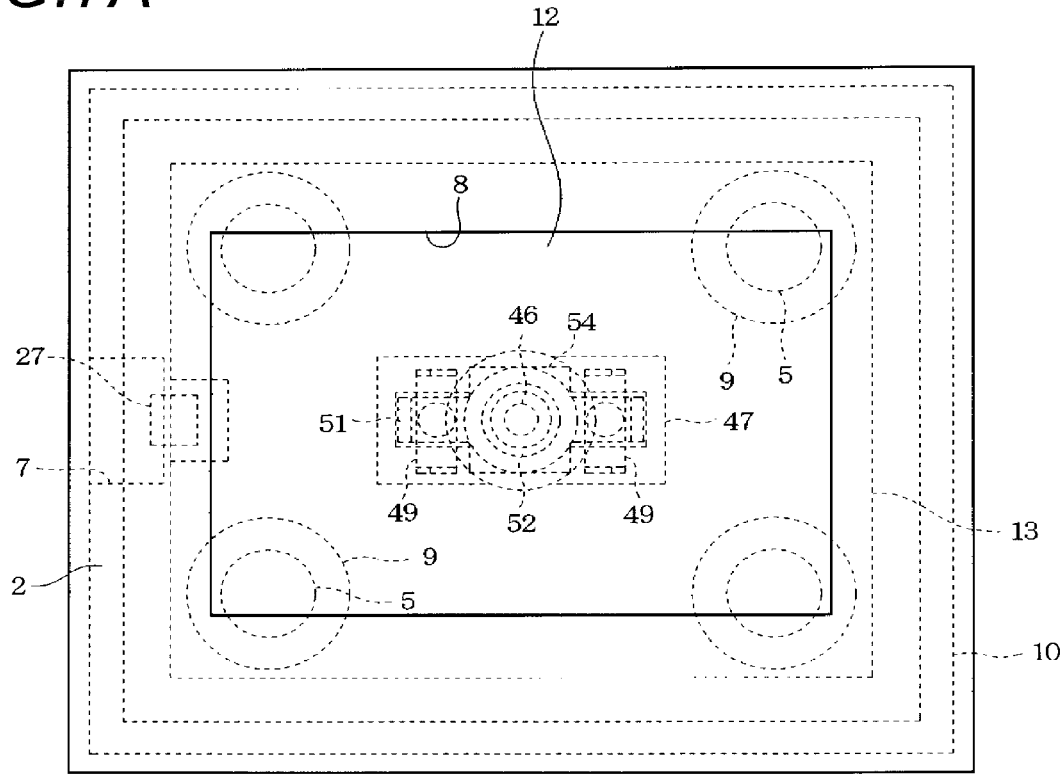
Figure 7B:
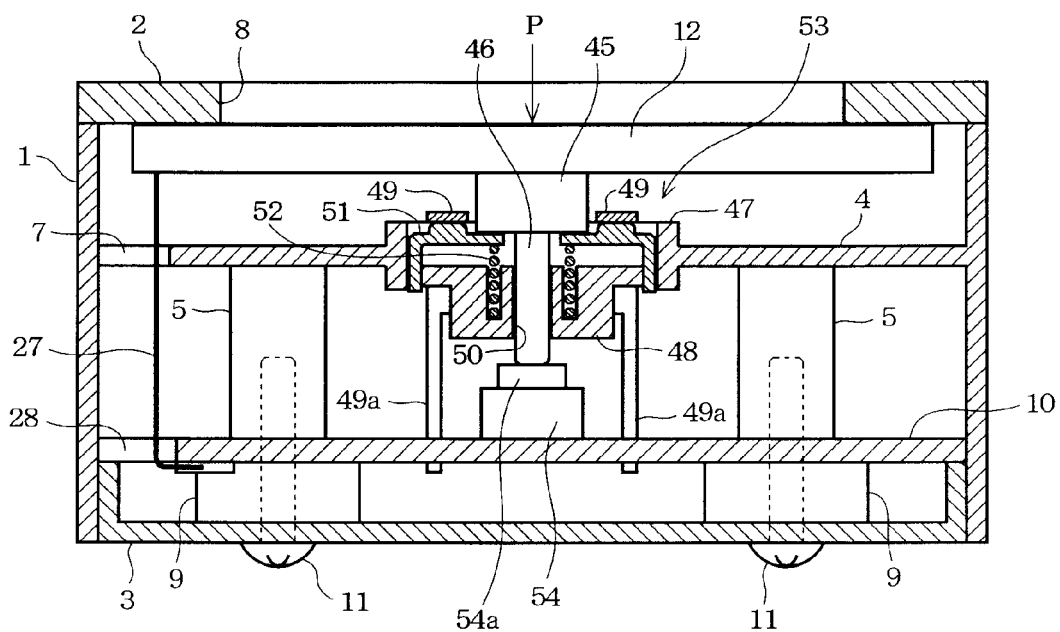
Figure 8:
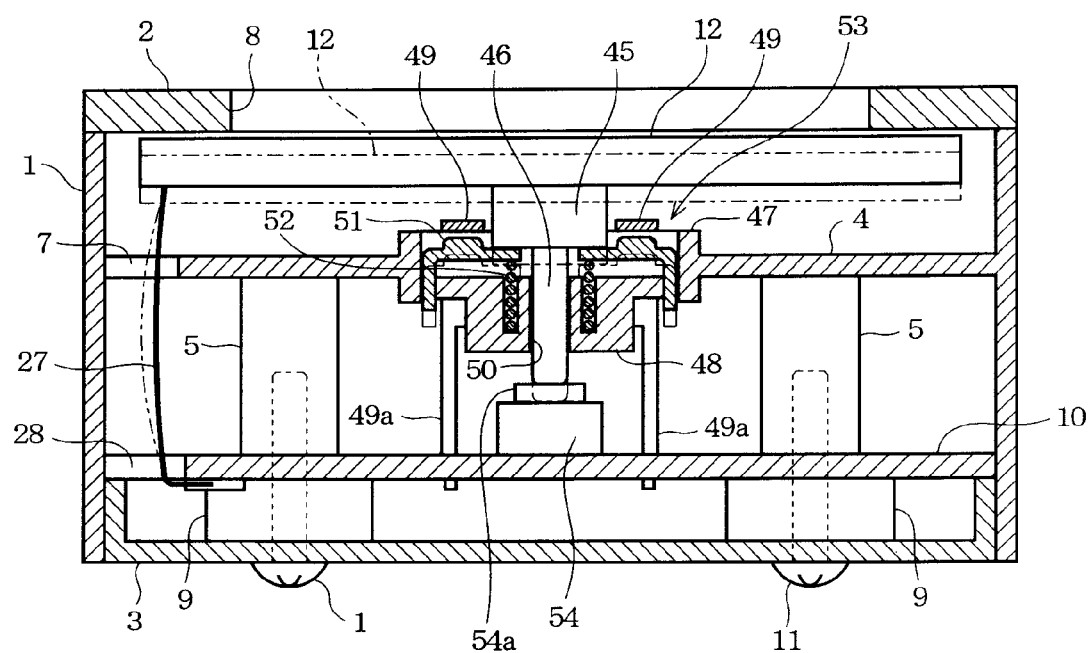
FIG. 8 is a vertically cross-sectional view illustrating the operation of the input device according to the third embodiment.

Referring to FIGS. 7A and 7B, a columnar first protrusion 45 protruded downward is disposed on the lower surface of the touch panel 12, and a columnar second protrusion 46 thinner than the first protrusion 45 is disposed on a lower surface of the first protrusion 45 downward. A fixed contact fitting part 47 is integrally formed on the partition part 4 in a substantially center thereof, and a spring bearing 48 is integrally formed on an interior of the fixed contact fitting part 47. A pair of fixed contacts 49 is fitted to the fixed contact fitting part 47 in a fixed state so as to be provided on both of the right and left sides of the first protrusion 45. One end of each fixed contact 49 is electrically connected to the wiring substrate 10 through each connection part 49a.

An insertion hole 50 that penetrates vertically is formed in the center of the spring bearing 48. The second protrusion 46 is inserted through the insertion hole 50 from above so as to be movable vertically, and a lower end of the second protrusion 46 is protruded from the insertion hole 50 downward. A movable contact 51 is vertically movably disposed between the lower surface of the first protrusion 45 and the spring bearing 48. A compression coil 52 configuring an urging unit is disposed between a lower surface of the movable contact 51 and the spring bearing 48. The movable contact 51 is abutted against the pair of fixed contacts 49 from below by an urging force of the compression coil 52.

In this example, the pair of fixed contacts 49 and the movable contact 51 that comes in or out of contact with the fixed contacts 49 configure a normally closed switch 53. In a state where the touch panel 12 is located at the upper original position illustrated in FIG. 7B, the normally closed switch 53 is on where the movable contact 51 comes in contact with the fixed contacts 49, and the circuit is closed. The normally closed switch 53 configures a depression start detector that detects the depression start of the touch panel 12.

Figure 9:
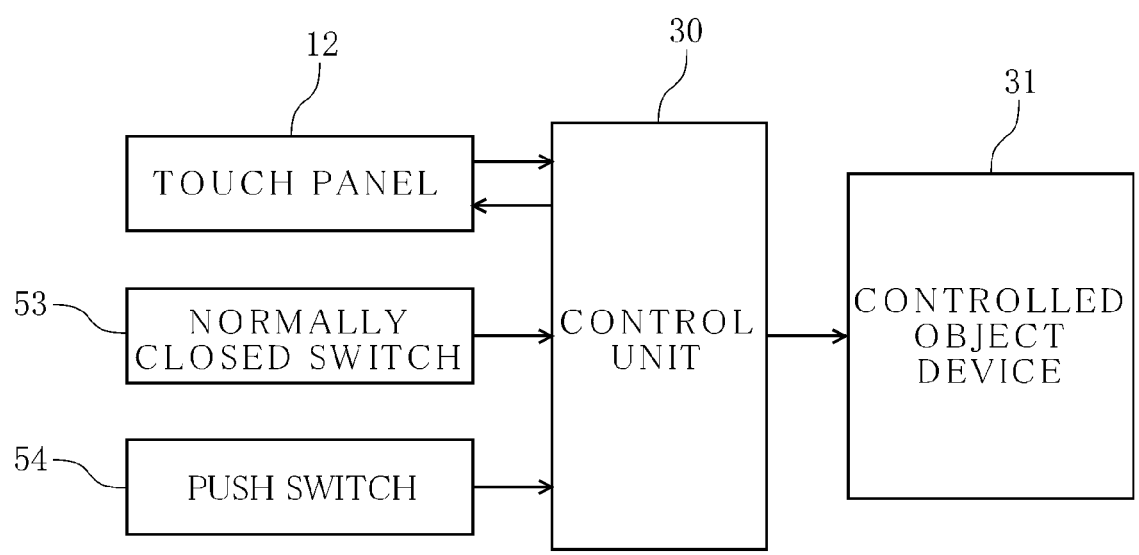
FIG. 9 is a block diagram illustrating an electric configuration of the input device.

A push switch 54 is provided on the upper surface of the wiring substrate 10 below the second protrusion 46. The push switch 54 is a bottom switch having an operator 54a protruded upward, and when the operator 54a is depressed downward by a given stroke, a switch element not shown turns on. When a depression force exerted on the operator 54a is removed, the operator 54a is restored upward to turn off the switch element. An upper surface of the operator 54a is abutted against a lower surface of the second protrusion 46 from below. The push switch 54 configures a determination manipulation detector that detects that the determination manipulation has been conducted on the touch panel 12. As illustrated in FIG. 9, a signal of the normally closed switch 53 and a signal of the push switch 54 are also input to the control unit 30.

Subsequently, the operation of the above configuration will be described.

The touch panel 12 is located at the original position illustrated in FIG. 7B in the non-depressed state, and a plurality of selection items are displayed in the display unit of the touch panel 12. In this state, when the user selects one selection item from a plurality of displayed selection items to execute the selected item, the user touches a position at which a desired selection item is displayed among the plurality of selection items displayed on the touch panel 12 with his finger, and depresses the touch panel 12 downward in that state (refer to an arrow P in FIG. 7B). With this manipulation, the touch panel 12 is displaced downward from the original position whereby the movable contact 51 of the normally closed switch 53 is spaced apart from the fixed contacts 49 downward (refer to solid position in FIG. 8), and the circuit is opened, and turns off. In this state, the operator 54a of the push switch 54 is not moved by a given stroke, and is kept off. Thereafter, the touch panel 12 is further displaced downward so that the operator 54a of the push switch 54 is depressed by the given stroke, and the push switch 54 turns on (refer to two-dot chain lines in FIG. 8).

In this situation, the control unit 30 determines that the touch panel 12 has started to be depressed, by turning off the normally closed switch 53, stores the touch position (coordinates) of the finger at that time, and stores the selected item. Thereafter, the control unit 30 determines that the determination manipulation has been conducted, by turning on the push switch 54, determines that the manipulation for determining the item corresponding to the stored touch position has been conducted, and controls the controlled object device 31 corresponding to that item.

In this situation, even if the position of the finger is displaced since the touch panel 12 starts to be depressed until the push switch 54 turns on, the control unit 30 determines that the determination manipulation has been conducted with the selection of the item corresponding to the position of the finger when starting to depress the touch panel 12 (when the normally closed switch 53 turns off). As a result, the positional displacement when conducting the determination manipulation can be prevented as much as possible, and the determination manipulation can be prevented from being conducted without the user's intent. Also, in the determination manipulation, there is a need to turn on the push switch 54 of a stroke sufficient for the user to have the stroke feeling. Therefore, similarly, according to this embodiment, the positional displacement when conducting the determination manipulation can be prevented as much as possible while having the stroke suitable for the determination manipulation.

In this embodiment, in particular, there is advantageous in that a moment when the touch panel 12 starts to be displaced downward can be detected by the normally closed switch 53.

Fourth Embodiment

Figure 10A:
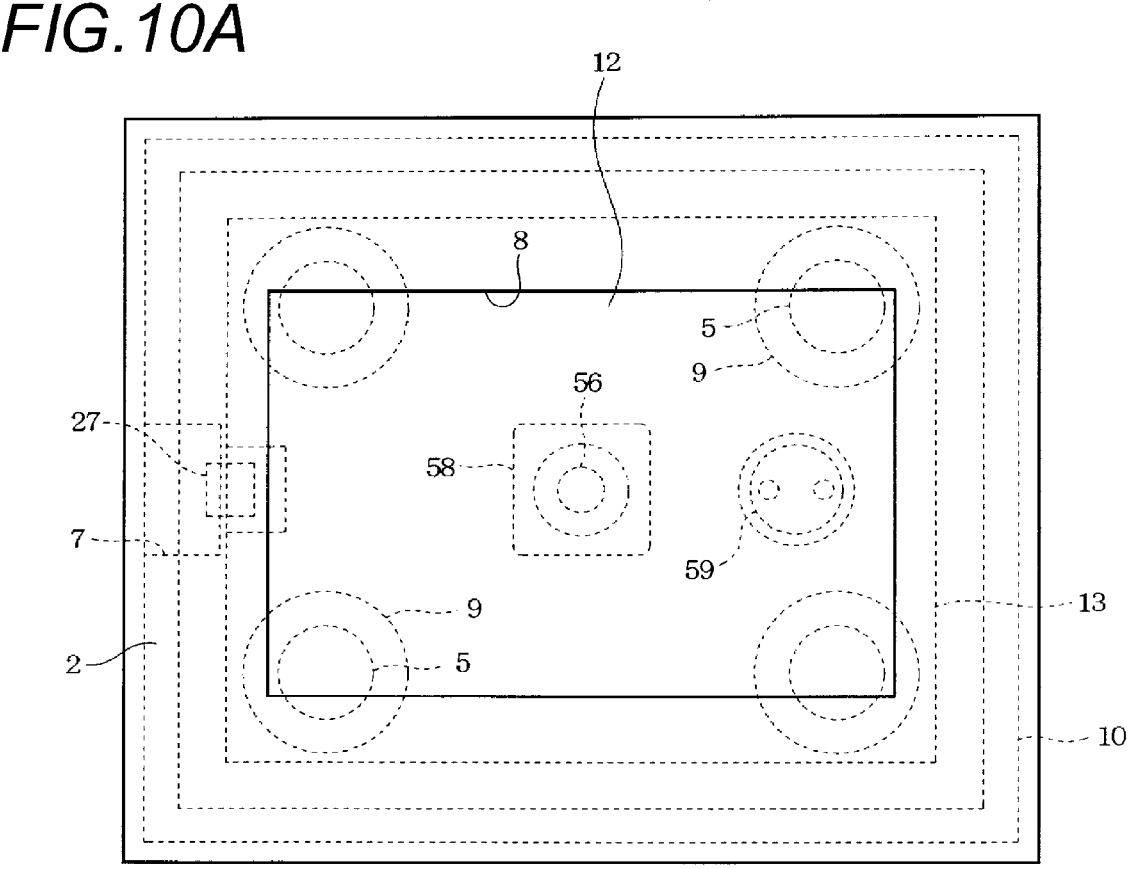
Figure 10B:
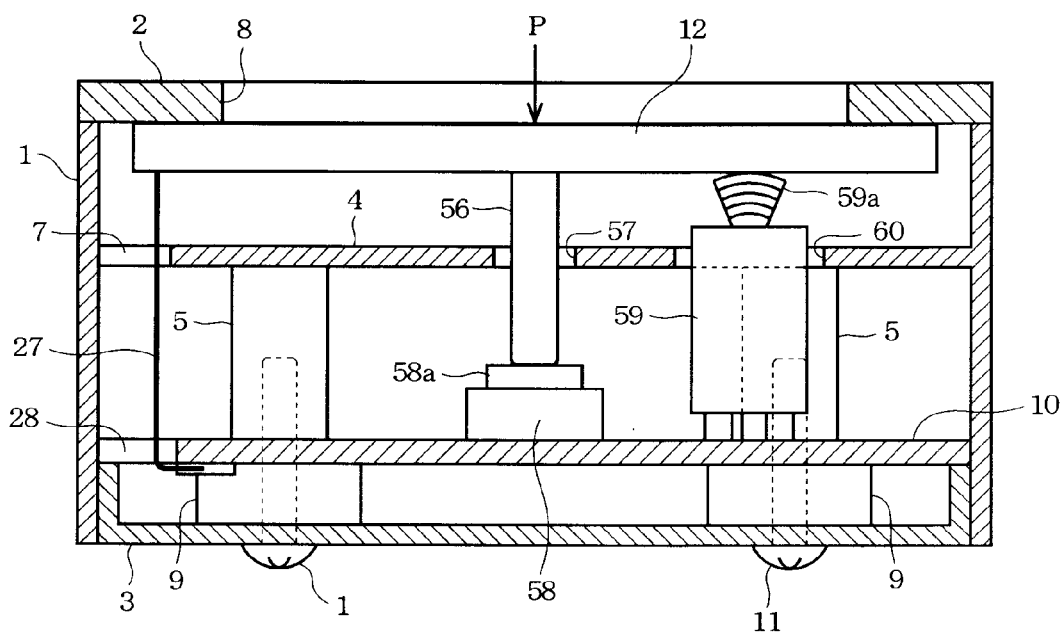
Figure 11:
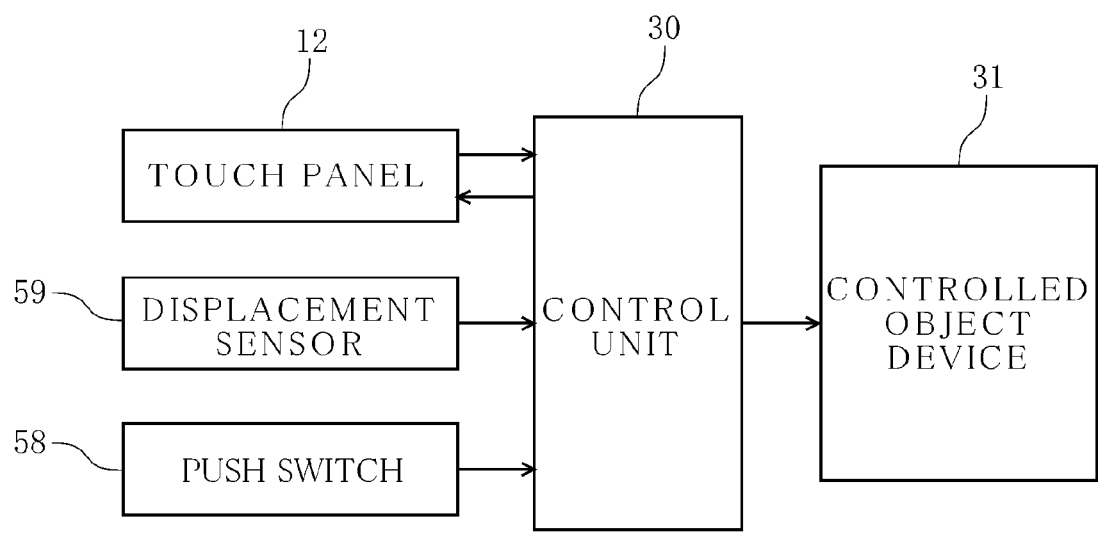
FIG. 11 is a block diagram illustrating an electric configuration of the input device.

FIGS. 10A, 10B, and 11 illustrate a fourth embodiment of the present disclosure. The fourth embodiment is different from the first embodiment in the following matters.

A columnar protrusion 56 protruded downward is disposed on the lower surface of the touch panel 12, and a lower end of the protrusion 56 is protruded downward through an opening part 57 formed in the partition part 4. A push switch 58 is provided on the upper surface of the wiring substrate 10 below the protrusion 56. The push switch 58 has the same configuration as that of the push switch 54 in the third embodiment, and is a bottom switch having an operator 58a protruded upward, and when the operator 58a is depressed downward by a given stroke, a switch element not shown turns on. When a depression force exerted on the operator 58a is removed, the operator 58a is restored upward to turn off the switch element. An upper surface of the operator 58a is abutted against a lower surface of the protrusion 56 from below. The touch panel 12 is located at the upper original position through the protrusion 56 due to an upper restoring force exerted on the operator 58a. Similarly, the push switch 58 configures a determination manipulation detector that detects that the manipulation of determining the touch panel 12 has been conducted.

A displacement sensor 59 is provided on the upper surface of the wiring substrate 10 at a right side of the push switch 58. An upper portion of the displacement sensor 59 is inserted into an opening part 60 formed in the partition part 4 from below, and faces the lower surface of the touch panel 12 from below. The displacement sensor 59 is, for example, of an infrared type, and has a function of irradiating the upper touch panel 12 with infrared rays to detect a distance between the touch panel 12 and the displacement sensor 59, and therefore a vertical position of the lower surface of the touch panel 12. Referring to FIGS. 10A and 10B, reference symbol 59*a* schematically represents the infrared rays emitted from the displacement sensor 59. The displacement sensor 59 is designed to detect a stroke as small as no finger displacement occurs when manipulating the touch panel 12, and configures a depression start detector that detects the depression start of the touch panel 12. The infrared type of the displacement sensor 59 can be replaced with an ultrasonic type. As illustrated in FIG. 11, a detection signal of the displacement sensor 59 and a signal of the push switch 58 are also input to the control unit 30.

Subsequently, the operation of the above configuration will be described.

The touch panel 12 is located at the original position illustrated in FIG. 10B in the non-depressed state, and a plurality of selection items are displayed in the display unit of the touch panel 12. In this state, when the user selects one selection item from a plurality of displayed selection items to execute the selected item, the user touches a position at which a desired selection item is displayed among the plurality of selection items displayed on the touch panel 12 with his finger, and depresses the touch panel 12 downward in that state (refer to an arrow P in FIG. 10B). With this manipulation, the touch panel 12 is displaced downward from the original position. The downward displacement of the touch panel 12 is detected by the displacement sensor 59.

The control unit 30 determines that the touch panel 12 has started to be depressed, when determining that the touch panel 12 has been displaced to a predetermined set value according to a detection signal from the displacement sensor 59. At that time, the control unit 30 stores the touch position (coordinates) of the finger, and stores the selected item. It is assumed that the set value at that time is a short amount of displacement for detecting that the touch panel 12 has started to be depressed. In this situation, the operator 58*a* of the push switch 58 is also depressed by the protrusion 56 so as to be slightly displaced downward. However, the amount of displacement (the amount of stroke) is small, and the push switch 58 remains off. Then, when the touch panel 12 is further depressed downward, and the operator 58*a* is depressed by a given stroke, the push switch 58 turns on. The control unit 30 determines that the determination manipulation has been conducted, on the basis of an on signal of the push switch 58, determines that the manipulation for determining the item corresponding to the stored touch position has been conducted, and controls the controlled object device 31 corresponding to that item.

In this situation, even if the position of the finger is displaced since the touch panel 12 starts to be depressed until the push switch 58 turns on, the control unit 30 determines that the determination manipulation has been conducted with the selection of the item corresponding to the position of the finger when starting to depress the touch panel 12 (when the displacement sensor 59 detects the depression start of the touch panel 12). As a result, the positional displacement when conducting the determination manipulation can be prevented as much as possible, and the determination manipulation can be prevented from being conducted without the user's intent. Also, in the determination manipulation, there is a need to turn on the push switch 58 of a stroke sufficient for the user to have the stroke feeling. Therefore, similarly, according to this embodiment, the positional displacement when conducting the determination manipulation can be prevented as much as possible while having the stroke suitable for the determination manipulation.

In this embodiment, in particular, if the displacement sensor 59 that detects the displacement of the touch panel 12 is of a noncontact type that detects the position of the touch panel 12 to be detected in a non-contact manner, the displacement detection can be advantageously implemented without affecting the manipulation feeling of the push switch 58 that conducts the determination manipulation through the touch panel 12. The displacement sensor is not limited to the non-contact type, but, for example, a bar type variable resistor can be used if an output corresponding to the vertical position of the touch panel 12 is generated. Also, the position at which the touch panel 12 starts to be depressed can be easily adjusted by changing the set value of the control unit 30 compared with the detection signal (detection value) of the displacement sensor 59.

Fifth Embodiment

Figure 12A:
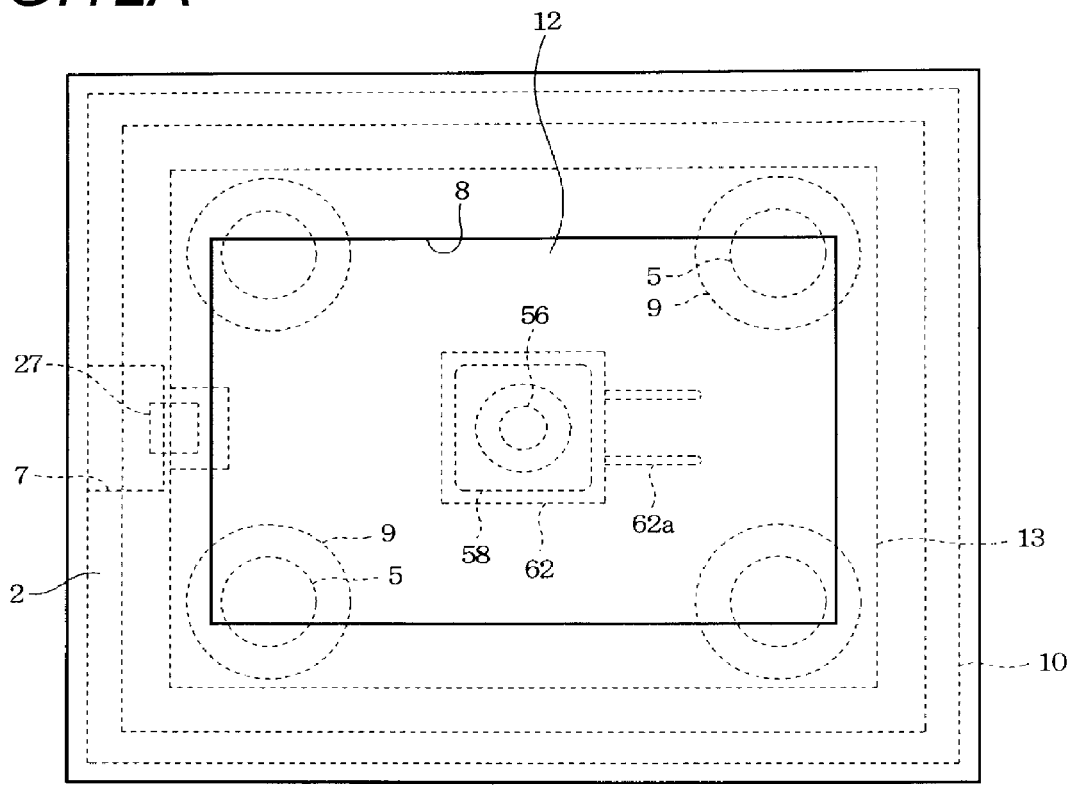
Figure 12B:
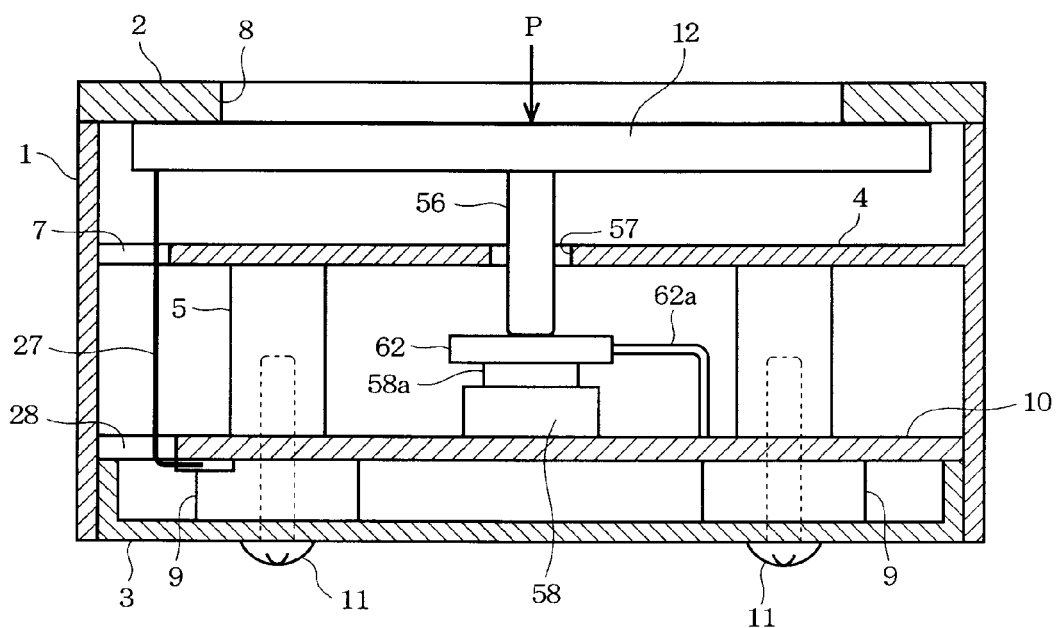
Figure 13:
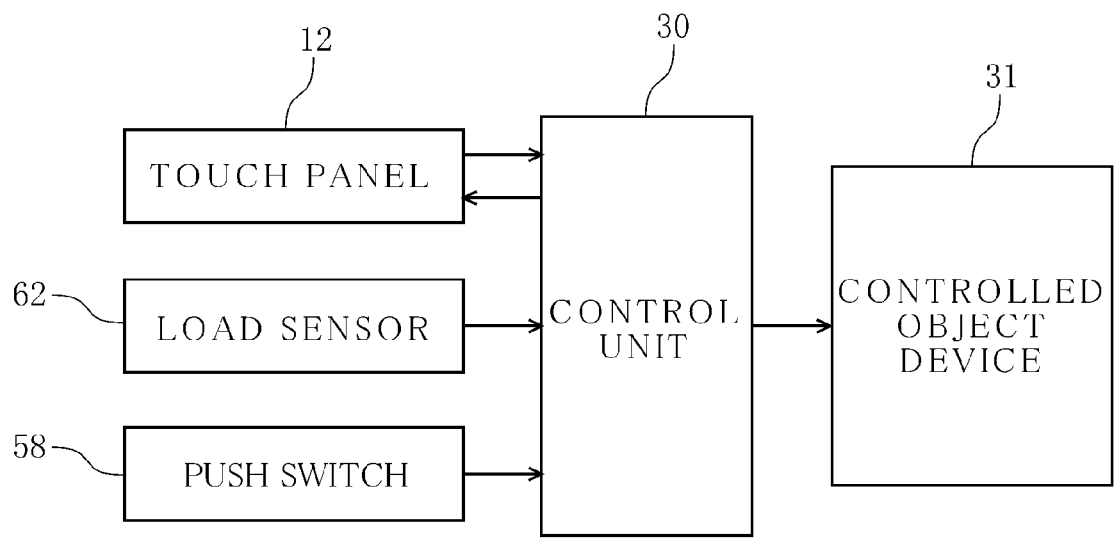
FIG. 13 is a block diagram illustrating an electric configuration of the input device.

FIGS. 12A, 12B, and 13 illustrate a fifth embodiment of the present disclosure. The fifth embodiment is different from the fourth embodiment in the following matters.

As the depression start detector, the displacement sensor 59 is replaced with a load sensor 62. The load sensor 62 is configured by, for example, a piezoelectric element, and disposed between an upper surface of the operator 58*a* of the push switch 58 and the lower surface of the protrusion 56. A connection line 62*a* of the load sensor 62 is elastically deformable, and has a leading end connected to the wiring substrate 10. As illustrated in FIG. 13, a signal of the load sensor 62 is also input to the control unit 30.

Subsequently, the operation of the above configuration will be described.

The touch panel 12 is located at the original position illustrated in FIG. 12B in the non-depressed state, and a plurality of selection items are displayed in the display unit of the touch panel 12. In this state, when the user selects one selection item from a plurality of displayed selection items to execute the selected item, the user touches a position at which a desired selection item is displayed among the plurality of selection items displayed on the touch panel 12 with his finger, and depresses the touch panel 12 downward in that state (refer to an arrow P in FIG. 12B). With this manipulation, the load sensor 62 interposed between the protrusion 56 of the touch panel 12 and the operator 58*a* of the push switch 58 is subject to a press load from the protrusion 56 to detect the load. It is preferable that the load sensor 62 is not deformed by the subjected load.

When the control unit 30 determines that a predetermined load (load smaller than a manipulation load with which the operator 58*a* of the push switch 58 is manipulated) has been exerted, according to the detection signal from the load sensor 62, the control unit 30 determines that the depression of the touch panel 12 has started. At that time, the control unit 30 stores the touch position (coordinates) of the finger, and stores the selected item. In this situation, the push switch 58 remains off.

Then, when the touch panel 12 is further depressed downward, and the operator 58a is depressed by a given stroke through the load sensor 62, the push switch 58 turns on. The control unit 30 determines that the determination manipulation has been conducted, on the basis of an on signal of the push switch 58, determines that the manipulation for determining the item corresponding to the stored touch position has been conducted, and controls the controlled object device 31 corresponding to that item.

In this situation, even if the position of the finger is displaced since the touch panel 12 starts to be depressed until the push switch 58 turns on, the control unit 30 determines that the determination manipulation has been conducted with the selection of the item corresponding to the position of the finger when starting to depress the touch panel 12 (when the displacement sensor 62 detects the depression start of the touch panel 12). As a result, the positional displacement when conducting the determination manipulation can be prevented as much as possible, and the determination manipulation can be prevented from being conducted without the user's intent. Also, in the determination manipulation, there is a need to turn on the push switch 58 of a stroke sufficient for the user to have the stroke feeling. Therefore, similarly, according to this embodiment, the positional displacement when conducting the determination manipulation can be prevented as much as possible while having the stroke suitable for the determination manipulation.

Also, in this embodiment, the position at which the touch panel 12 starts to be depressed can be easily adjusted by changing the set value of the control unit 30 compared with the detection signal (detection value) of the displacement sensor 62.

Sixth Embodiment

Figure 14:
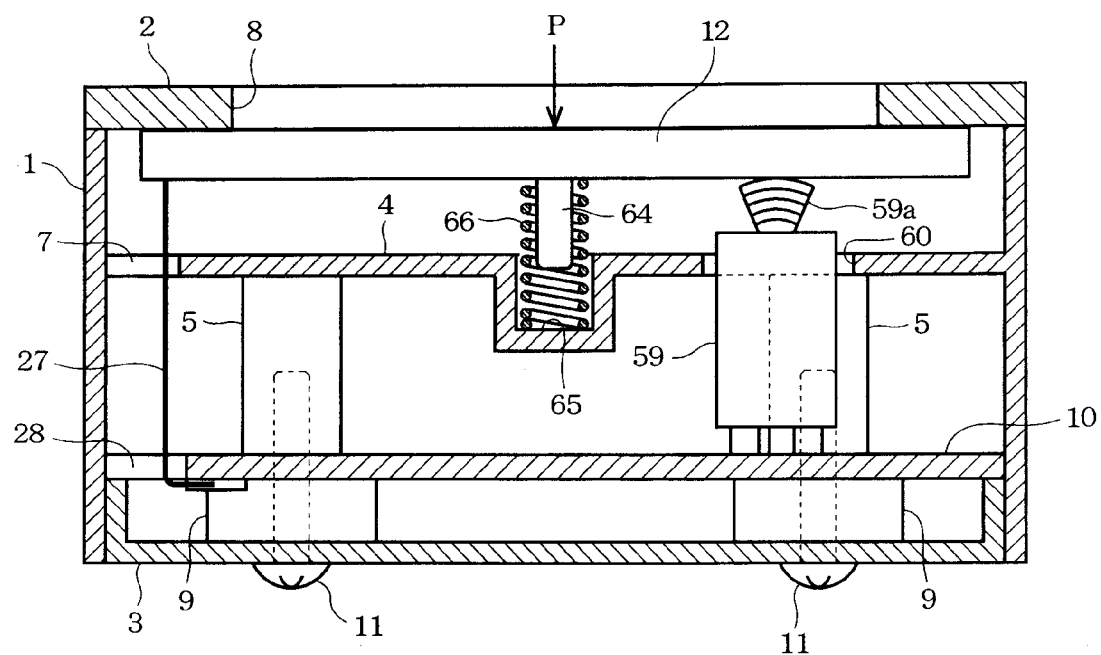
FIG. 14 is a diagram illustrating an input device according to a sixth embodiment, which corresponds to a configuration of FIG. 1B.
Figure 15:
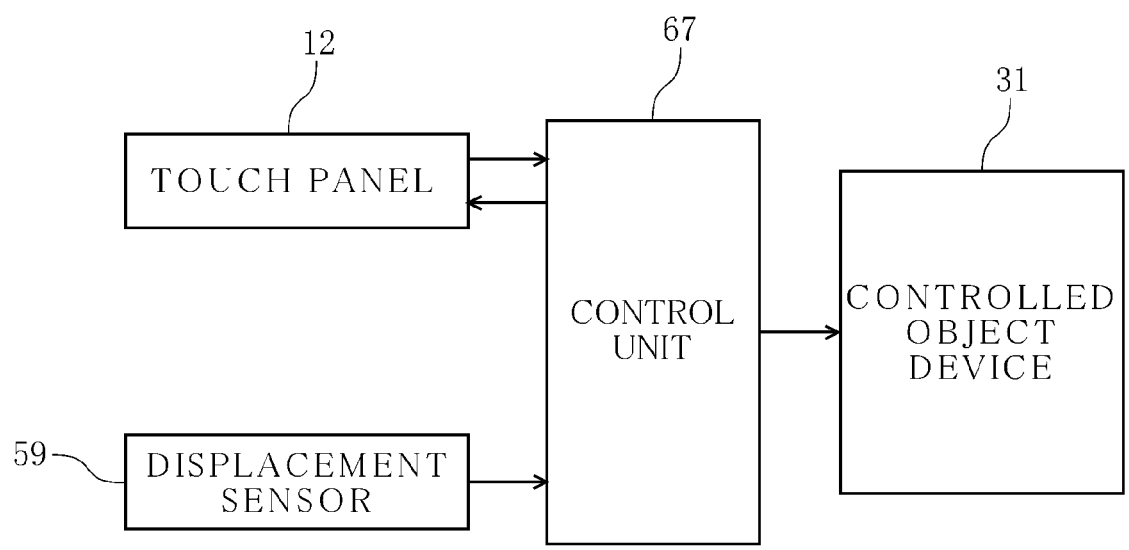
FIG. 15 is a block diagram illustrating an electric configuration of the input device according to the sixth embodiment.
Figure 16:
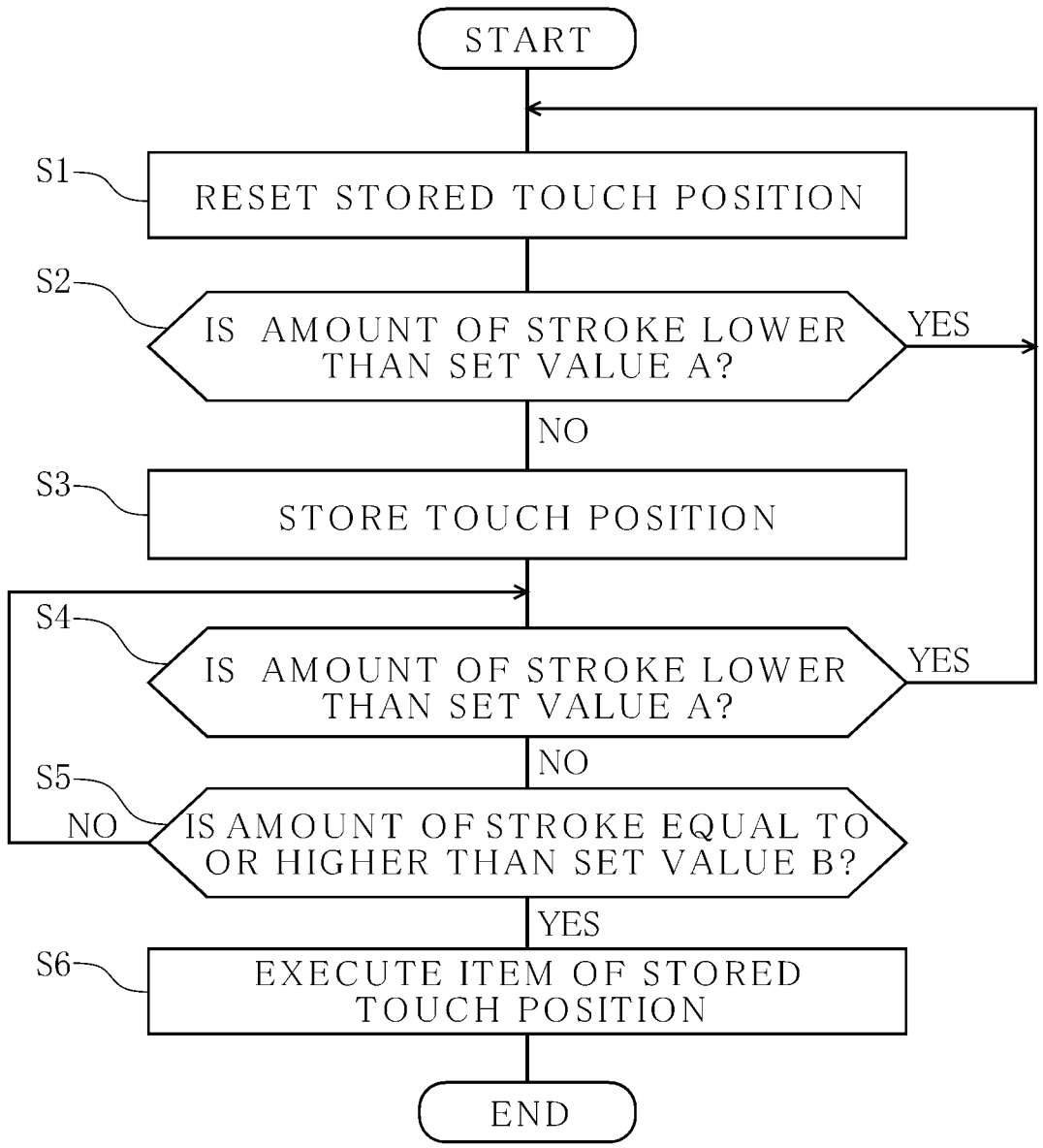
FIG. 16 is a flowchart illustrating the detection of depression manipulation.

FIGS. 14 to 16 illustrate a sixth embodiment of the present disclosure. The sixth embodiment is different from the fourth embodiment in the following matters.

Referring to FIG. 14, in this case, the push switch 58 is not provided. A recess spring bearing 65 is disposed in the partition part 4 in correspondence with a protrusion 64 disposed on the lower surface of the touch panel 12. The spring bearing 65 is larger than an outer shape of the protrusion 64, and a lower end of the protrusion 64 is vertically movably inserted into the spring bearing 65. A compression coil spring 66 is arranged between the spring bearing 65 and the lower surface of the touch panel 12. The compression coil spring 66 is arranged to surround the protrusion 64 from the outside thereof, and has an upper end abutted against the lower surface of the touch panel 12 to configure an urging unit that urges the touch panel 12 against the upper original position. In this case, the displacement sensor 59 servers as both of a depression start detector that detects the depression start of the touch panel 12, and a determination manipulation detector that detects the determination manipulation, and outputs detection signals thereof to a control unit 67 as illustrated in FIG. 15. The control unit 67 has the same configuration as that of the control unit 30, and functions as a decision unit of the present disclosure.

Subsequently, the operation of the above configuration will be described.

The touch panel 12 is located at the original position illustrated in FIG. 14 in the non-depressed state, and a plurality of selection items are displayed in the display unit of the touch panel 12. In this state, when the user selects one selection item from a plurality of displayed selection items to execute the selected item, the user touches a position at which a desired selection item is displayed among the plurality of selection items displayed on the touch panel 12 with his finger, and depresses the touch panel 12 downward in that state (refer to an arrow P). With this manipulation, the touch panel 12 is displaced downward from the original position. The downward displacement of the touch panel 12 is detected by the displacement sensor 59.

When the control unit 67 determines that the touch panel 12 has been displaced to a predetermined set value A, according to the detection signal from the displacement sensor 59, the control unit 67 determines that the touch panel 12 has started to be depressed. At that time, control unit 67 stores the touch position (coordinates) of the finger, and stores the selected item. The set value A in this situation is a short displacement for detecting that the touch panel 112 starts to be depressed.

Then, when the touch panel 12 is further depressed downward, and the control unit 67 determines that the touch panel 12 has been displaced to a predetermined set value B (set value B is larger than the set value A), according to the detection signal from the displacement sensor 59, the control unit 67 determines that the determination manipulation has been conducted, determines that the manipulation for determining the item corresponding to the stored touch position has been conducted, and controls the controlled object device 31 corresponding to that item.

FIG. 16 illustrates an example of the control content of the control unit 67 at that time, and the control content of the control unit 67 will be described with reference to FIG. 16. When the control unit 67 first stores a touch position (coordinates) therein, the control unit 67 resets the touch position (Step S1), and determines whether the amount of strokes by which the touch panel 12 has been displaced is smaller than the set value A, or not, according to the detection signal from the displacement sensor 59 (Step S2). The set value A represents a small amount of displacement for detecting that the touch panel 12 has started to be depressed. If the amount of stroke detected by the displacement sensor 59 is smaller than the set value A, the flow is returned to Step S1.

When the manipulation of depressing the touch panel 12 has been conducted, and the amount of stroke detected by the displacement sensor 59 becomes equal to or larger than the set value A, the control unit 67 determines that the touch panel 12 has started to be depressed. The flow proceeds to Step S3 with "no" in Step S2, and the control unit 67 stores the touch position (coordinates) of the finger at that time. Thereafter, the control unit 67 again determines whether the amount of stroke detected by the displacement sensor 59 is smaller than the set value A, or not (Step S4). If the control unit 67 determines that the amount of stroke is smaller than the set value A, the flow returns to Step S1. If the control unit 67 determines that the amount of stroke is equal to or larger than the set value A, the flow proceeds to Step S5.

In Step S5, it is determined whether the amount of stroke detected by the displacement sensor 59 is equal to or larger than the set value B larger than the set value A, or not. If the control unit 67 determines that the amount of stroke detected by the displacement sensor 59 is equal to or larger than the set value B, the control unit 67 determines that the manipulation of depressing the touch panel 12 has been conducted to conduct the determination manipulation, and the flow proceeds to Step S6. The control unit 67 controls the controlled object device 31 corresponding to the item corresponding to the touch position stored in Step S3. In Step S5, if the control unit 67 determines that the amount of stroke detected by the displacement sensor 59 is not larger than the set value B, the flow is returned to Step S4.

In the above-mentioned embodiment, even if the position of the finger is displaced since the touch panel 12 starts to be depressed until it is determined that the determination manipulation has been conducted, the control unit 67 determines that the determination manipulation has been conducted with the selection of the item corresponding to the position of the finger when starting to depress the touch panel 12 (when the displacement sensor 59 detects the depression start of the touch panel 12). As a result, the positional displacement when conducting the determination manipulation can be prevented as much as possible, and the determination manipulation can be prevented from being conducted without the user's intent. Also, in the determination manipulation, there is a need to conduct the depression manipulation until the amount of stroke becomes equal to or larger than the set value B which is sufficient for the user to have the stroke feeling. Accordingly, similarly in this embodiment, the positional displacement when conducting the determination manipulation can be prevented as much as possible while having the stroke suitable for the determination manipulation.

In this embodiment, particularly, since the displacement sensor 59 is configured to serve as the depression start detector and the determination manipulation detector, there is advantageous in that the number of parts can be reduced. The displacement sensor for detection of the depression start and the displacement sensor for detection of the determination manipulation can be provided, separately.

Seventh Embodiment

Figure 17:
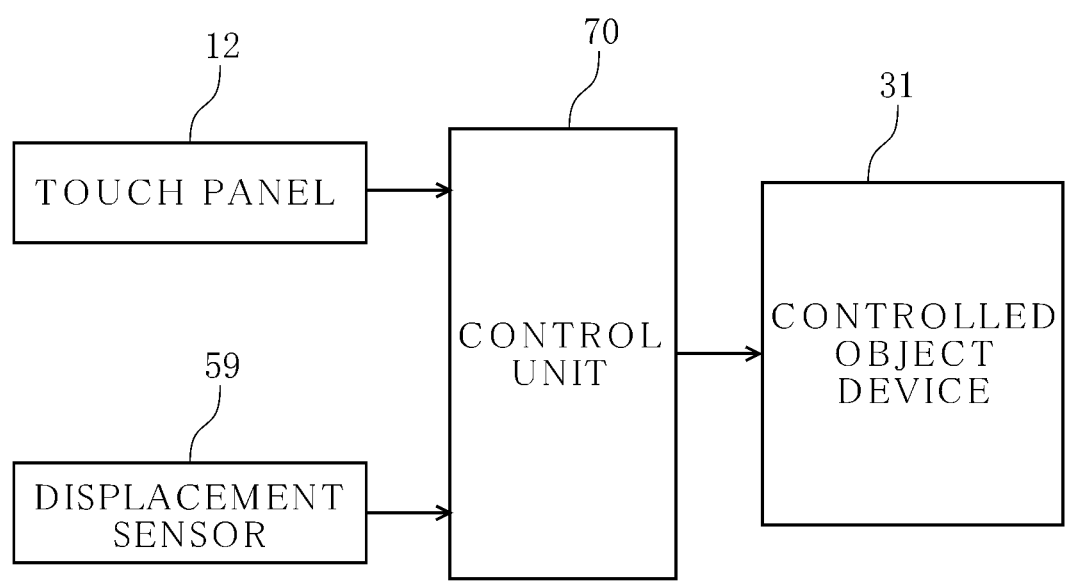
FIG. 17 is a block diagram illustrating an electric configuration of an input device according to a seventh embodiment, which corresponds to a configuration of FIG. 4.
Figure 18:
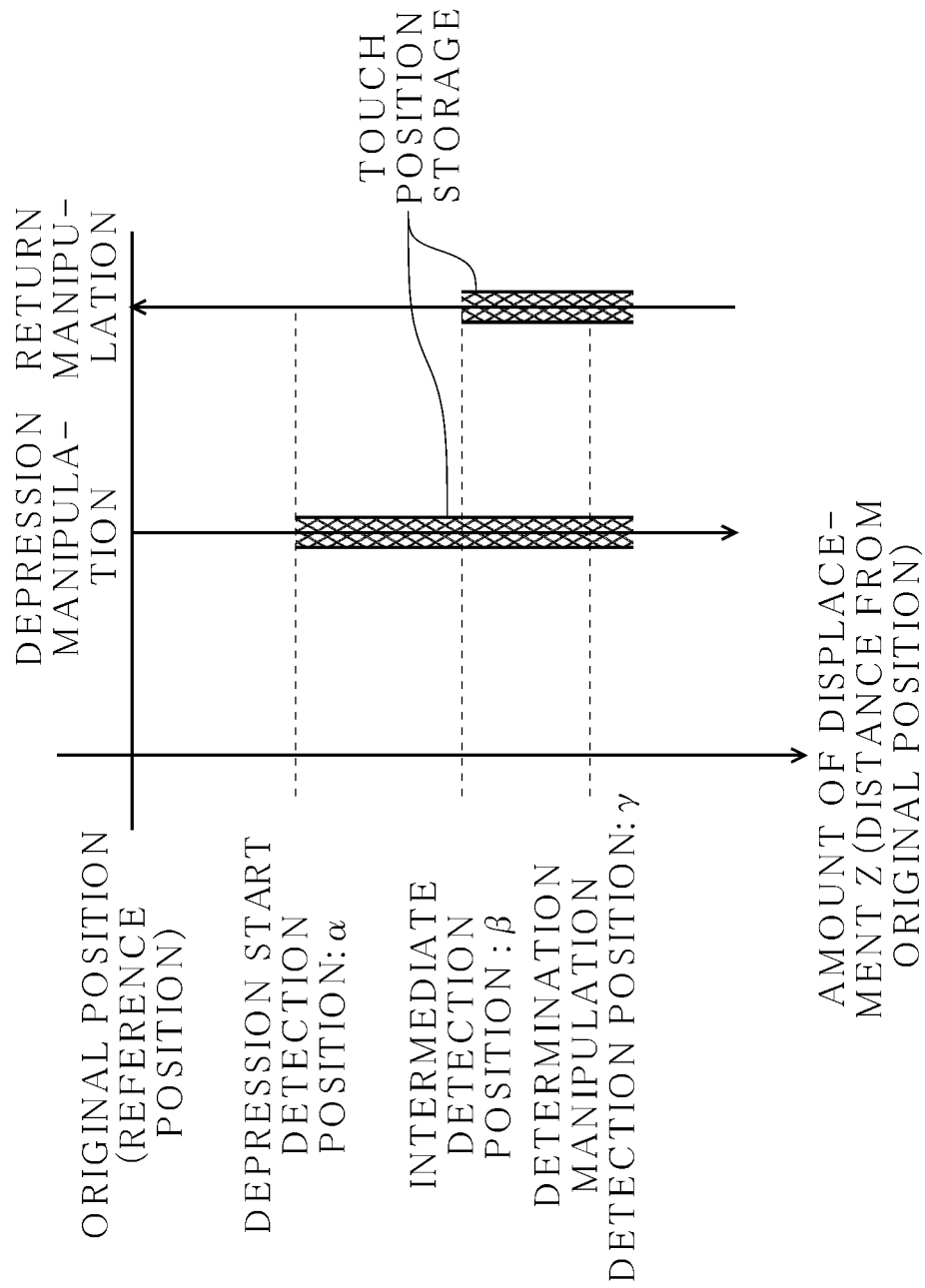
FIG. 18 is a diagram illustrating a relationship between positions of the touch panel in a displacement direction and detection states at the times of depression manipulation and a return manipulation.
Figure 19:
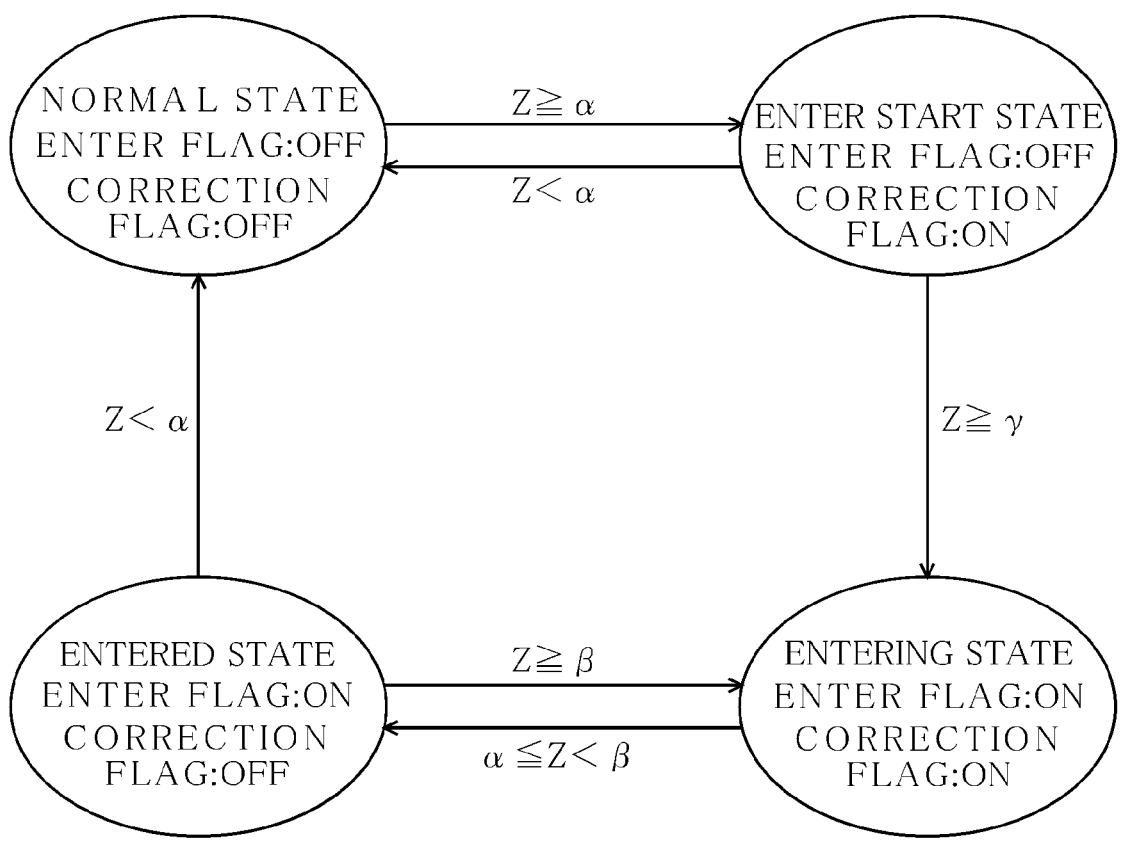
FIG. 19 is a diagram of state transitions to explain the input device according to the seventh embodiment.

FIGS. 17 to 19 illustrate a seventh embodiment of the present disclosure. The seventh embodiment is different from the sixth embodiment in the following matters.

Referring to FIG. 17, in this case, no display unit is provided in the touch panel 12, and the display unit is provided in a controlled object device 31. When the surface of the touch panel 12 is touched with the user's finger, the touch position is detected by the touch position detector, and a mark indicative of the touch position is displayed in the display unit of the controlled object device 31 in correspondence with the touch position. Also, in this case, the displacement sensor 59 that detects the displacement position of the touch panel 12 in the displacement direction serves as the depression start detector and the determination manipulation detector. A control unit 70 functions as a decision unit, and transmits information related on the touch position to the controlled object device 31 in conducting the determination manipulation as will be described later.

As illustrated in FIG. 18, as the detection positions by the displacement sensor 59 are set a reference position at which the touch panel 12 is located at the original position as well as a depression start detection position (the amount of displacement $\alpha$ from the original position), a determination manipulation detection position (the amount of displacement $\gamma$ from the original position), and an intermediate detection position (the amount of displacement $\beta$ from the original position) located between those positions, in the displacement direction (depression direction) of the touch panel 12. In this case, the amount of displacement Z of the touch panel 12 has positive in the depression direction (downward). The relationship of the amount of displacement $\alpha$, $\beta$, and $\gamma$ satisfies $\alpha<\beta<\gamma$.

Subsequently, the operation of the above configuration will be described with reference to FIGS. 14, 17, 18, and 19.

The touch panel 12 is located at the original position (reference position) illustrated in FIG. 14 in the non-depressed state. Also, for example, a plurality of selection items is displayed in the display unit of the controlled object device 31. In this state, as illustrated in FIG. 19, as the input device, in the normal state, an enter flag is set to off, and a correction flag is also set to off in the control unit 70.

When the user touches the surface of the touch panel 12 with his finger in the normal state, the touch position detector detects the touch position, and the mark indicative of the touch position is displayed in the display unit of the controlled object device 31 according to the touch position. When one selection item is selected from a plurality of selection items displayed in the display unit, and executed, the user depresses the touch panel 12 while the mark indicative of the touch position is allowed to correspond to the desired item (refer to an arrow P in FIG. 14). With this operation, the touch panel 12 is displaced in the depression direction (downward). The displacement of the touch panel 12 in the depression direction is detected by the displacement sensor 59.

When the control unit 70 determines that the touch panel 12 has been displaced by $\alpha$ or more which is a predetermined depression start detection position, according to a detection signal from the displacement sensor 59 (when the control unit 70 determines that the touch panel 12 has arrived at the depression start detection position, or exceeded that position) ($Z \geq \alpha$), the touch panel 12 comes to an enter start state. The control unit 70 determines that the touch panel 12 has started to be depressed, and at that time, stores and fixes the touch position (coordinates) detected by the touch position detector. In this situation, in the control unit 70, the enter flag remains off, and the correction flag is set to on.

If the user ceases the depression manipulation before the touch panel 12 arrives at the determination manipulation detection position ($Z<\gamma$), and his finger moves away from the touch panel 12, the touch panel 12 is returned to the original position direction. In this situation, when the control unit 70 determines that the amount of displacement Z of the touch panel 12 has become smaller than $\alpha$ of the depression start detection position, according to the detection signal from the displacement sensor 59 ($Z<\alpha$), the control unit 70 determines that the depression manipulation of the touch panel 12 has been ceased, and the touch panel 12 returns to the normal state. With this operation, the control unit 70 cancels the storage of the stored touch position (coordinates), and changes the correction flag to off.

On the other hand, in the enter start state (state in which the touch position (coordinates) is stored and fixed), the touch panel 12 is further depressed, and if the control unit 70 determines that the amount of displacement Z of the touch panel 12 has been displaced by $\gamma$ or more which is the determination manipulation detection position, according to the detection signal from the displacement sensor 59 (if the control unit 70 determines that the touch panel 12 has arrived at the determination manipulation detection position, or exceeded that position) ($Z \geq \gamma$), the touch panel 12 comes to the enter state, and the control unit 70 determines that the determination manipulation has been conducted at the stored touch position, and transmits this determination to the controlled object device 31. In the controlled object device 31, the selected item is executed. In this situation, in the control unit 70, the correction flag remains on, and the enter flag is set to on.

In the enter state, when the user cancels the depression manipulation force exerted on the touch panel 12, the touch panel 12 is returned from the determination manipulation detection position to the original position direction (upward). If the control unit 70 determines that the amount of displacement Z of the touch panel 12 has become larger than $\alpha$ of the depression start detection position, and smaller than $\beta$ of the intermediate detection position, according to the detection signal from the displacement sensor 59 ($\alpha \leq Z < \beta$), the control unit 70 cancels the storage of the stored touch position (coordinates), and changes the correction flag to off. With this operation, the touch panel 12 comes to an entered state. The position of the touch panel 12 further moves up, and if the control unit 70 determines that the amount of displacement Z of the touch panel 12 has become smaller than a of the depression start detection position ($Z < \alpha$), the control unit 70 also changes the enter flag to off, and the touch panel 12 comes to the original normal state.

Now, a description will be given of a case where the user again conducts the depression manipulation when the touch panel 12 is returned to the original position direction after the touch panel 12 has arrived at the determination manipulation detection position once with the depression manipulation of the user. In the case where the touch panel 12 is returned to the original position direction after the touch panel 12 has arrived at the determination manipulation detection position once, when the position of the touch panel 12 becomes smaller (moves higher) than $\beta$ which is the intermediate detection position, the control unit 70 cancels the storage of the stored touch position as described above. Then, when the control unit 70 detects that the touch panel 12 has been depressed and become $\beta$ or more which is the intermediate detection position (displaced below $\beta$) before the position of the touch panel 12 moves up to a which is the depression start detection position, the control unit 70 stores and fixes the touch position detected by the touch position detector at that time. When the touch panel 12 is displaced to $\gamma$ which is the depression detection position, the control unit 70 determines that the determination manipulation has been conducted at the stored touch position, and transmits this determination to the controlled object device 31.

Also, in the case where the touch panel 12 is returned to the original position direction after the touch panel 12 has arrived at the determination manipulation detection position once, when the position of the touch panel 12 has become smaller than $\alpha$ which is the depression start detection position once, the touch panel 12 returns to the normal state. For that reason, when the touch panel 12 is again depressed in that state, the control unit 70 stores and fixes the touch position (coordinates) of the finger when the position of the touch panel 12 is depressed to $\alpha$ which is the depression start detection position, as described above.

According to the above embodiment, in the case where the user again conducts the depression manipulation when the touch panel 12 is returned to the original position direction after the touch panel 12 has arrived at the determination manipulation detection position once with the depression manipulation of the user, the stored touch position (coordinates) is canceled when the position of the touch panel 12 arrives at the intermediate detection position between the determination manipulation detection position and the depression start detection position. As a result, even if the user again conducts the depression manipulation while the user touches the touch panel 12, the stored touch panel can be prevented from being fixed without any change, as much as possible.

Also, in the above case, when the position of the touch panel 12 again exceeds the intermediate detection position downward, the touch position is again restored, and thereafter the touch panel 12 arrives at the determination manipulation detection position. As a result, since it is determined that the determination manipulation has been conducted at the restored touch position, this operation can deal with the manipulation intended by the user.

Other Embodiments

The present disclosure is not limited to only the above-mentioned respective embodiments, but can be modified or expanded as follows.

The display unit that displays the items is not limited to the integration with the touch panel 12, but may be provided separately from the touch panel 12.

The present application is based on Japanese Patent Application No. 2011-173840 filed on Aug. 9, 2011 and Japanese Patent Application No. 2012-134736 filed on Jun. 14, 2012, the contents of which are incorporated herein by reference.

What is claimed is:

1. An input device comprising:
  a touch panel configured to be displaceable in vertical direction and to be urged upwardly toward an original position in a non-depressed state, comprising:
  a touch position detector which detects a touch position when a surface of the touch panel is touched with a finger;
  a depression start detector that detects a start of a depression manipulation of the touch panel while the touch panel is depressed and displaced downward to a first vertical displacement position;
  a determination manipulation detector that detects a determination manipulation when the touch panel is displaced to a second vertical displacement position which is lower than the first vertical displacement position where the depression start detector detects the start of the depression manipulation of the touch panel; and
  a decision unit that;
  when the depression start detector detects that the touch panel arrives at the first vertical displacement position, stores the touch position detected by the touch position detector, and thereafter
  when the determination manipulation detector detects that the touch panel arrives at the second vertical displacement position, decides that the determination manipulation has been conducted at the touch position, which is stored when the depression start detector detects that the touch panel arrives at the first vertical displacement position, wherein
    a first touch position is detected by the touch position detector when the depression start detector detects the start of the depression manipulation of the touch panel;
    a second touch position is detected by the touch position detector when the determination manipulation detector detects the determination manipulation; and
    when the touch panel is depressed from the first vertical displacement position to the second vertical displacement position, the decision unit decides that the determination manipulation has been conducted at the first touch position, even when the first touch position and the second touch position are different, or the first touch position and the second touch position are the same.

2. The input device according to claim 1, wherein the depression start detector includes a displacement sensor which detects the first and second vertical displacement positions of the touch panel.

3. The input device according to claim 2, wherein the displacement sensor serves as the depression start detector and the determination manipulation detector.

4. The input device according to claim 3, wherein an intermediate detection position is set between the first and second vertical displacement positions; and wherein the decision unit cancels the stored touch position when the displacement sensor detects that the touch panel has arrived at the intermediate detection position while returning from the second vertical displacement position toward the original position.

5. The input device according to claim 4, wherein after the decision unit cancels the stored touch position and before the touch panel arrives at the first vertical displacement position, at a time when the displacement sensor detects that the touch panel has arrived at the intermediate detection position by again depressing the touch panel, the decision unit stores the touch position detected by the touch position detector at that time, and thereafter when the determination manipulation detector detects that the touch panel has arrived at the second vertical displacement position, the decision unit decides that the determination manipulation has been conducted at the stored touch position.

6. The input device according to claim 1, wherein the depression start detector includes a short-stroke switch which operates when the touch panel is displaced downward from the original position to the first vertical displacement position; and wherein the determination manipulation detector includes a long-stroke switch which operates when the touch panel is displaced downward to the second vertical displacement position.

7. The input device according to claim 1, wherein the depression start detector includes a normally closed switch in which a circuit is closed in a state where the touch panel is located at the original position, and the circuit is opened by displacing the touch panel downward from the original position to detect the start of the depression manipulation of the touch panel.

8. The input device according to claim 1, wherein the depression start detector includes a load sensor which detects a load pressed by the touch panel.

9. The input device according to claim 1, wherein after storing the touch position, the decision unit holds the stored touch position and does not decide that the determination manipulation has been conducted until the determination manipulation detector detects that the touch panel arrives at the second vertical displacement position.

10. An input device comprising:
a touch panel configured to be displaceable in a vertical direction and to be urged upwardly toward an original position in a non-depressed state, comprising:
a touch position detector which detects a touch position when a surface of the touch panel is touched with a finger;
a displacement sensor that detects a vertical displacement of the touch panel while the touch panel is depressed from the original touch position and displaced downward in a pressing operation of the touch panel with the finger; and
a control unit that:
when the displacement sensor detects that the touch panel arrives at a first vertical displacement position, stores a touch position detected by the touch position detector, and thereafter,
when the displacement sensor detects that the touch panel arrives at a second vertical displacement position which is lower than the first vertical displacement position, decides that a determination manipulation has been conducted at the touch position, which is stored when the touch panel arrives at the first vertical displacement position,
wherein
a first touch position is detected by the touch position detector when the displacement sensor detects a start of the vertical displacement of the touch panel;
a second touch position is detected by the touch position detector when the displacement sensor detects the vertical displacement; and
when the touch panel is depressed from the start of the vertical displacement to the second vertical displacement position, the control unit decides that the depression manipulation has been conducted at the first touch position, even when the first touch position and the second touch position are different, or the first touch position and the second touch position are the same.

11. The input device according to claim 10, wherein the control unit holds the stored touch position and does not decide that the determination manipulation has been conducted while the touch panel positions between the first vertical displacement position and the second vertical displacement position in one pressing operation of the touch panel.

12. The input device according to claim 10,
wherein the control unit becomes a specific state where the control unit,
when the displacement sensor detects that the touch panel arrives at a third vertical displacement position which is between the first vertical displacement position and the second vertical displacement position, stores the touch position detected by the touch position detector, and thereafter,
when the displacement sensor detects that the touch panel arrives at the second vertical displacement position, decides that a determination manipulation has been conducted at the touch position, which is stored when the touch panel arrives at the third vertical displacement position.

13. The input device according to claim 12, wherein the control unit becomes the specific state after the control unit decides that the determination manipulation has been conducted but before the touch panel becomes higher than the first vertical displacement position.

* * * * *